(12) United States Patent
Krutka et al.

(10) Patent No.: US 9,278,314 B2
(45) Date of Patent: Mar. 8, 2016

(54) METHOD AND SYSTEM TO RECLAIM FUNCTIONAL SITES ON A SORBENT CONTAMINATED BY HEAT STABLE SALTS

(71) Applicants: Holly Krutka, Centennial, CO (US); Sharon Sjostrom, Sedalia, CO (US); William J. Morris, Evergreen, CO (US)

(72) Inventors: Holly Krutka, Centennial, CO (US); Sharon Sjostrom, Sedalia, CO (US); William J. Morris, Evergreen, CO (US)

(73) Assignee: ADA-ES, Inc., Highlands Ranch, CO (US)

( * ) Notice: Subject to any disclaimer, the term of this patent is extended or adjusted under 35 U.S.C. 154(b) by 231 days.

(21) Appl. No.: 14/032,030

(22) Filed: Sep. 19, 2013

(65) Prior Publication Data

US 2014/0079612 A1    Mar. 20, 2014

Related U.S. Application Data

(60) Provisional application No. 61/703,591, filed on Sep. 20, 2012.

(51) Int. Cl.
| | |
|---|---|
| *B01D 53/14* | (2006.01) |
| *B01D 53/50* | (2006.01) |
| *B01D 53/56* | (2006.01) |
| *B01D 53/62* | (2006.01) |
| *B01D 53/74* | (2006.01) |
| *B01D 53/96* | (2006.01) |
| *B01D 53/83* | (2006.01) |

(52) U.S. Cl.
CPC ............... *B01D 53/96* (2013.01); *B01D 53/62* (2013.01); *B01D 53/83* (2013.01); *B01D 2252/204* (2013.01); *B01D 2257/504* (2013.01); *B01D 2258/0283* (2013.01); *Y02C 10/04* (2013.01)

(58) Field of Classification Search
CPC .... B01D 53/14; B01D 53/1456; B01D 53/50; B01D 53/523; B01D 53/526; B01D 53/56; B01D 53/74
See application file for complete search history.

(56) References Cited

U.S. PATENT DOCUMENTS

| | | |
|---|---|---|
| 2,712,728 A | 7/1955 | Lewis |
| 2,739,105 A | 3/1956 | Ford |
| 2,819,204 A | 1/1958 | Martin |
| 2,835,605 A | 5/1958 | Nelson |

(Continued)

FOREIGN PATENT DOCUMENTS

| | | |
|---|---|---|
| CN | 101500704 | 8/2009 |
| CN | 101909743 | 12/2010 |

(Continued)

OTHER PUBLICATIONS

Han et al., "Powder Technology Dictionary," 1999, 4 pages (No English translation available).
Luo et al., "Fluidized Sorting Theory," 202, 4 pages (No English translation available) 2002.
Preliminary Search Report (English translation) for Chinese Patent Application No. 201280028787.1, dated Feb. 10, 2015, 2 pages.
Official Action (English translation) for Chinese Patent Application No. 201280028787.1, dated Feb. 17, 2015, 10 pages.

(Continued)

*Primary Examiner* — Timothy Vanoy
(74) *Attorney, Agent, or Firm* — Sheridan Ross P.C.

(57) ABSTRACT

The objective of this invention is to develop a method to reclaim functional sites on a $CO_2$ sorbent that have reacted with an acid gas (other than $CO_2$) to form heat stable salts (HSS). HSS are a significant concern for dry sorbent based $CO_2$ capture because over time the buildup of HSS will reduce the overall functionality of the $CO_2$ sorbent. A chemical treatment can remove the non-$CO_2$ acid gas and reclaim functional sites that can then be used for further $CO_2$ adsorption.

18 Claims, 7 Drawing Sheets

(56) References Cited

U.S. PATENT DOCUMENTS

| | | | |
|---|---|---|---|
| 2,838,385 A | 6/1958 | Brown | |
| 2,843,462 A | 7/1958 | Brown | |
| 2,843,533 A | 7/1958 | Smith | |
| 2,869,992 A | 1/1959 | Brown | |
| 2,872,384 A | 2/1959 | Nelson | |
| 2,979,388 A | 4/1961 | Brown | |
| 2,983,673 A | 5/1961 | Grove | |
| 2,984,620 A | 5/1961 | Fleck | |
| 2,998,354 A | 8/1961 | Brown | |
| 3,131,052 A | 4/1964 | Peras | |
| 3,201,491 A | 8/1965 | Stine | |
| 3,205,166 A | 9/1965 | Ludlow | |
| 3,231,492 A | 1/1966 | Stine | |
| 3,274,099 A | 9/1966 | Broughton | |
| 3,290,309 A | 12/1966 | Marten | |
| 3,310,486 A | 3/1967 | Broughton | |
| 3,328,401 A | 6/1967 | Marten | |
| 3,442,620 A | 5/1969 | Schora, Jr. | |
| 3,574,545 A * | 4/1971 | Grantham | 423/563 |
| 3,594,985 A * | 7/1971 | Ameen et al. | 95/163 |
| 3,599,610 A | 8/1971 | Spector | |
| 3,656,887 A * | 4/1972 | Suzuki et al. | 423/226 |
| 3,816,298 A | 6/1974 | Aldridge | |
| 3,877,397 A | 4/1975 | Davies | |
| 4,021,370 A | 5/1977 | Harris | |
| 4,029,862 A | 6/1977 | Liu | |
| 4,110,423 A | 8/1978 | Botton | |
| 4,115,929 A | 9/1978 | Staub et al. | |
| 4,152,122 A | 5/1979 | Feldmann | |
| 4,230,602 A | 10/1980 | Bowen | |
| 4,254,557 A | 3/1981 | Mayer | |
| 4,254,558 A | 3/1981 | Mayer | |
| 4,254,616 A | 3/1981 | Siminski | |
| 4,255,166 A | 3/1981 | Gernand | |
| 4,255,403 A | 3/1981 | Mayer | |
| 4,257,171 A | 3/1981 | Johnson et al. | |
| 4,274,942 A | 6/1981 | Bartholic | |
| 4,283,204 A | 8/1981 | Savage | |
| 4,319,892 A | 3/1982 | Waghorne | |
| 4,319,893 A | 3/1982 | Hatch | |
| 4,353,992 A | 10/1982 | Pannekeet | |
| 4,400,181 A | 8/1983 | Snell | |
| 4,409,416 A | 10/1983 | Snell | |
| 4,410,420 A | 10/1983 | Liss | |
| 4,423,274 A | 12/1983 | Daviduk | |
| 4,452,612 A | 6/1984 | Mattia | |
| 4,472,172 A | 9/1984 | Sheer | |
| 4,550,217 A | 10/1985 | Graziani | |
| 4,661,258 A | 4/1987 | Phillips | |
| 4,848,249 A | 7/1989 | LePori | |
| 4,871,485 A | 10/1989 | Rivers | |
| 4,965,232 A | 10/1990 | Mauleon | |
| 4,973,430 A | 11/1990 | Rivers | |
| 4,988,590 A | 1/1991 | Price | |
| 4,990,371 A | 2/1991 | Dutta | |
| 5,049,198 A | 9/1991 | Ribas | |
| 5,049,408 A | 9/1991 | Klinedinst | |
| 5,059,404 A | 10/1991 | Mansour | |
| 5,061,465 A * | 10/1991 | Carter | 423/229 |
| 5,087,427 A | 2/1992 | Quinn | |
| 5,198,029 A | 3/1993 | Dutta | |
| 5,240,592 A | 8/1993 | Meyer | |
| 5,356,845 A | 10/1994 | Clavenna | |
| 5,536,488 A | 7/1996 | Mansour | |
| 5,545,251 A | 8/1996 | Knop | |
| 5,626,741 A | 5/1997 | Mosby | |
| 5,637,192 A | 6/1997 | Mansour | |
| 5,665,427 A | 9/1997 | Horne | |
| 5,733,941 A | 3/1998 | Waycuilis | |
| 5,789,331 A | 8/1998 | Tsunoda | |
| 6,056,928 A | 5/2000 | Fetzer | |
| 6,099,819 A | 8/2000 | Srinivas | |
| 6,143,915 A | 11/2000 | Zhou | |
| 6,149,765 A | 11/2000 | Mansour | |
| 6,160,187 A | 12/2000 | Strickler | |
| 6,201,029 B1 | 3/2001 | Waycuilis | |
| 6,258,978 B1 | 7/2001 | Kitchen | |
| 6,264,738 B1 | 7/2001 | Lorke | |
| 6,281,384 B1 | 8/2001 | Maganlal | |
| 6,310,240 B1 | 10/2001 | Maganlal | |
| 6,313,361 B1 | 11/2001 | Waycuilis | |
| 6,387,337 B1 | 5/2002 | Pennline et al. | |
| 6,437,193 B1 | 8/2002 | Maganlal | |
| 6,525,232 B1 | 2/2003 | Bierl | |
| 6,547,854 B1 | 4/2003 | Gray et al. | |
| 6,649,130 B1 | 11/2003 | Zhou | |
| 6,663,681 B2 | 12/2003 | Kindig | |
| 6,716,025 B1 | 4/2004 | Risch | |
| 6,755,892 B2 | 6/2004 | Nalette et al. | |
| 6,768,036 B2 | 7/2004 | Lattner | |
| 6,806,226 B2 | 10/2004 | Van Berge | |
| 6,872,364 B2 | 3/2005 | Bierl | |
| 6,906,221 B2 | 6/2005 | Zeyss | |
| 6,908,497 B1 | 6/2005 | Sirwardane | |
| 6,916,953 B2 | 7/2005 | Walsdorff | |
| 6,921,834 B2 | 7/2005 | Hickman | |
| 6,987,208 B2 | 1/2006 | Risch | |
| 7,053,260 B2 | 5/2006 | Xu | |
| 7,148,171 B2 | 12/2006 | Lattner | |
| 7,491,317 B2 | 2/2009 | Meier et al. | |
| 7,531,705 B2 | 5/2009 | Lattner | |
| 7,544,339 B2 | 6/2009 | Lissianski et al. | |
| 7,557,180 B2 | 7/2009 | Cavaglia | |
| 7,579,383 B2 | 8/2009 | Lattner | |
| 7,589,246 B2 | 9/2009 | Iaccino | |
| 7,599,991 B2 | 10/2009 | Vargas et al. | |
| 7,615,510 B2 | 11/2009 | McDaniel | |
| 7,615,578 B2 | 11/2009 | Lattner | |
| 7,642,377 B1 | 1/2010 | Singh | |
| 7,659,437 B2 | 2/2010 | Iaccino | |
| 7,666,374 B2 | 2/2010 | Grochowski | |
| 7,678,954 B2 | 3/2010 | Kuechler | |
| 7,683,213 B2 | 3/2010 | Dubois | |
| 7,683,227 B2 | 3/2010 | Iaccino | |
| 7,686,855 B2 | 3/2010 | Sills | |
| 7,708,964 B2 | 5/2010 | Boardman | |
| 7,718,811 B2 | 5/2010 | Fiorentino | |
| 7,718,832 B1 | 5/2010 | Hurley | |
| 7,723,450 B2 | 5/2010 | Jones | |
| 7,728,186 B2 | 6/2010 | Iaccino | |
| 7,754,930 B2 | 7/2010 | Iaccino | |
| 7,759,531 B2 | 7/2010 | Pinkos | |
| 7,763,562 B2 | 7/2010 | Voskoboynikov | |
| 7,763,765 B2 | 7/2010 | Kuechler | |
| 7,767,191 B2 | 8/2010 | Thomas | |
| 7,772,335 B1 | 8/2010 | Cao | |
| 7,781,636 B2 | 8/2010 | Iaccino | |
| 7,785,447 B2 | 8/2010 | Eatough | |
| 7,794,690 B2 | 9/2010 | Abatzoglou | |
| 7,795,490 B2 | 9/2010 | Iaccino | |
| 7,799,118 B2 | 9/2010 | Beech, Jr. | |
| 7,819,949 B2 | 10/2010 | Sesing | |
| 7,834,108 B2 | 11/2010 | Ogawa | |
| 7,838,708 B2 | 11/2010 | Sherman | |
| 7,851,663 B2 | 12/2010 | Abhari | |
| 7,858,056 B2 | 12/2010 | Moyes | |
| 7,867,531 B2 | 1/2011 | Pockat | |
| 7,868,108 B2 | 1/2011 | Mihan | |
| 7,879,919 B2 | 2/2011 | Ernst | |
| 7,892,511 B2 | 2/2011 | Strait | |
| 7,893,308 B2 | 2/2011 | Sangar | |
| 7,897,812 B2 | 3/2011 | Machhammer | |
| 7,901,664 B2 | 3/2011 | Cao | |
| 7,915,191 B2 | 3/2011 | Hedrick | |
| 7,931,816 B2 | 4/2011 | Conger | |
| 7,935,857 B2 | 5/2011 | Beech | |
| 7,951,985 B2 | 5/2011 | Sangar | |
| 7,955,565 B2 | 6/2011 | Hamba | |
| 7,977,479 B2 | 7/2011 | Muller-Hasky | |
| 7,977,519 B2 | 7/2011 | Iaccino | |
| 7,977,522 B2 | 7/2011 | Takai | |
| 7,981,832 B2 | 7/2011 | McDaniel | |
| 7,982,080 B2 | 7/2011 | Xu | |
| 7,987,613 B2 | 8/2011 | Ness | |

(56) References Cited

U.S. PATENT DOCUMENTS

| | | | |
|---|---|---|---|
| 7,993,591 B2 | 8/2011 | Sato | |
| 7,993,593 B2 | 8/2011 | Sato | |
| 7,993,594 B2 | 8/2011 | Wei | |
| 8,013,200 B2 | 9/2011 | Takai | |
| 8,017,019 B2 | 9/2011 | Becker | |
| 8,029,893 B2 | 10/2011 | Siegel | |
| 8,030,420 B2 | 10/2011 | Ogawa | |
| 8,512,661 B2 * | 8/2013 | Fan et al. | 423/230 |
| 2001/0051589 A1 | 12/2001 | Van Berge | |
| 2002/0083833 A1 | 7/2002 | Nalette et al. | |
| 2002/0179489 A1 | 12/2002 | Choudhary | |
| 2003/0091485 A1 | 5/2003 | Bierl | |
| 2003/0113239 A1 | 6/2003 | Pahlman et al. | |
| 2003/0125596 A1 | 7/2003 | Lattner | |
| 2003/0157008 A1 | 8/2003 | Pahlman et al. | |
| 2003/0163010 A1 | 8/2003 | Xu | |
| 2003/0199720 A1 | 10/2003 | Lattner | |
| 2004/0097760 A1 | 5/2004 | Risch | |
| 2004/0204607 A1 | 10/2004 | Machhammer | |
| 2004/0226441 A1 * | 11/2004 | Palmer | 95/235 |
| 2005/0171311 A1 | 8/2005 | Schindler | |
| 2005/0214408 A1 | 9/2005 | Pilkington | |
| 2005/0255987 A1 | 11/2005 | McDaniel | |
| 2006/0099138 A1 | 5/2006 | Walsdorff | |
| 2006/0165574 A1 | 7/2006 | Sayari | |
| 2006/0201641 A1 | 9/2006 | Harris et al. | |
| 2006/0230930 A1 | 10/2006 | Knaebel | |
| 2006/0263290 A1 | 11/2006 | Walsdorff | |
| 2007/0027220 A1 | 2/2007 | Lattner | |
| 2007/0083073 A1 | 4/2007 | Bagherzadeh | |
| 2007/0232844 A1 | 10/2007 | Kuechler | |
| 2007/0244208 A1 | 10/2007 | Shulenberger | |
| 2007/0249879 A1 | 10/2007 | Iaccino | |
| 2007/0249880 A1 | 10/2007 | Iaccino | |
| 2007/0253886 A1 | 11/2007 | Abatzoglou | |
| 2007/0274898 A1 | 11/2007 | Weber | |
| 2007/0274900 A1 | 11/2007 | Bulan | |
| 2007/0276171 A9 | 11/2007 | Iaccino | |
| 2007/0286793 A1 | 12/2007 | Weber | |
| 2007/0286798 A1 | 12/2007 | Cao | |
| 2007/0293709 A1 | 12/2007 | Iaccino | |
| 2007/0299146 A1 | 12/2007 | Lattner | |
| 2008/0027402 A1 | 1/2008 | Schmidt | |
| 2008/0029404 A1 | 2/2008 | Weber | |
| 2008/0032035 A1 | 2/2008 | Schmidt | |
| 2008/0124551 A1 | 5/2008 | Daniel | |
| 2008/0154224 A1 | 6/2008 | Daniel | |
| 2008/0159948 A1 | 7/2008 | Sesing | |
| 2008/0161428 A1 | 7/2008 | Strait | |
| 2008/0187756 A1 | 8/2008 | Riegel | |
| 2008/0200331 A1 | 8/2008 | Daniel | |
| 2008/0233027 A1 | 9/2008 | Brettschneider | |
| 2008/0249342 A1 | 10/2008 | Iaccino | |
| 2008/0257150 A1 | 10/2008 | Wolf | |
| 2008/0260619 A1 | 10/2008 | Werner | |
| 2008/0267849 A1 | 10/2008 | Haas | |
| 2008/0281136 A1 | 11/2008 | Bagherzadeh | |
| 2008/0293976 A1 | 11/2008 | Olah et al. | |
| 2009/0048354 A1 | 2/2009 | Bell | |
| 2009/0203519 A1 | 8/2009 | Abatzoglou | |
| 2009/0205492 A1 | 8/2009 | Andrus et al. | |
| 2009/0239736 A1 | 9/2009 | Schmidt | |
| 2009/0275789 A1 | 11/2009 | Cao | |
| 2009/0304572 A1 | 12/2009 | Sesing | |
| 2010/0003439 A1 | 1/2010 | Michie, Jr. | |
| 2010/0010256 A1 | 1/2010 | Bulan | |
| 2010/0040527 A1 | 2/2010 | Randhava | |
| 2010/0044626 A1 | 2/2010 | Fischer | |
| 2010/0050517 A1 | 3/2010 | Tsilevich | |
| 2010/0063335 A1 | 3/2010 | Xie | |
| 2010/0069581 A1 | 3/2010 | Ogawa | |
| 2010/0071554 A1 | 3/2010 | Pfeffer | |
| 2010/0076164 A1 | 3/2010 | Agapiou | |
| 2010/0076222 A1 | 3/2010 | Singh | |
| 2010/0077947 A1 | 4/2010 | Hack | |
| 2010/0089794 A1 | 4/2010 | Bhan | |
| 2010/0092373 A1 | 4/2010 | Soppe | |
| 2010/0094039 A1 | 4/2010 | Ooms | |
| 2010/0099935 A1 | 4/2010 | Iaccino | |
| 2010/0115839 A1 | 5/2010 | Brown | |
| 2010/0116746 A1 | 5/2010 | Pfeffer | |
| 2010/0121125 A1 | 5/2010 | Hippo | |
| 2010/0127429 A1 | 5/2010 | Scott | |
| 2010/0132259 A1 | 6/2010 | Haque | |
| 2010/0132359 A1 | 6/2010 | Minhas | |
| 2010/0173767 A1 | 7/2010 | Koch | |
| 2010/0174129 A1 | 7/2010 | Bauman | |
| 2010/0179232 A1 | 7/2010 | Robinson | |
| 2010/0179296 A1 | 7/2010 | Vermeiren | |
| 2010/0180771 A1 | 7/2010 | Liu | |
| 2010/0183498 A1 | 7/2010 | Wolf | |
| 2010/0184927 A1 | 7/2010 | Hagerty | |
| 2010/0184933 A1 | 7/2010 | Vermeiren | |
| 2010/0184976 A1 | 7/2010 | Kuhrs | |
| 2010/0187161 A1 | 7/2010 | Anastasijevic | |
| 2010/0196253 A1 | 8/2010 | Becnel | |
| 2010/0197986 A1 | 8/2010 | Midorikawa | |
| 2010/0200458 A1 | 8/2010 | Kalnes | |
| 2010/0203495 A1 | 8/2010 | Medoff | |
| 2010/0203607 A1 | 8/2010 | Medoff | |
| 2010/0205863 A1 | 8/2010 | Biollaz | |
| 2010/0209322 A1 | 8/2010 | Mesters | |
| 2010/0212550 A1 | 8/2010 | Zhang | |
| 2010/0216629 A1 | 8/2010 | Vermeiren | |
| 2010/0217035 A1 | 8/2010 | Knoesche | |
| 2010/0221475 A1 | 9/2010 | Sukhadia | |
| 2010/0222527 A1 | 9/2010 | Sukhadia | |
| 2010/0222582 A1 | 9/2010 | Kern | |
| 2010/0224835 A1 | 9/2010 | Chornet | |
| 2010/0228062 A1 | 9/2010 | Babicki | |
| 2010/0237290 A1 | 9/2010 | Rolland | |
| 2010/0240935 A1 | 9/2010 | Iaccino | |
| 2010/0240937 A1 | 9/2010 | Gartside | |
| 2010/0249007 A1 | 9/2010 | Holderbaum | |
| 2010/0249009 A1 | 9/2010 | Holderbaum | |
| 2010/0249355 A1 | 9/2010 | Davis | |
| 2010/0255985 A1 | 10/2010 | Gaffney | |
| 2010/0255986 A1 | 10/2010 | Gaffney | |
| 2010/0256245 A1 | 10/2010 | Iaccino | |
| 2010/0256316 A1 | 10/2010 | Vermeiren | |
| 2010/0256432 A1 | 10/2010 | Arnold | |
| 2010/0261892 A1 | 10/2010 | Weisser | |
| 2010/0261944 A1 | 10/2010 | Nesterenko | |
| 2010/0263534 A1 | 10/2010 | Chuang | |
| 2010/0266477 A1 | 10/2010 | Ishii | |
| 2010/0266481 A1 | 10/2010 | Haas | |
| 2010/0266702 A1 | 10/2010 | Cousin | |
| 2010/0266795 A1 | 10/2010 | Pockat | |
| 2010/0266908 A1 | 10/2010 | de Graffenried, Sr. | |
| 2010/0269411 A1 | 10/2010 | Goetsch | |
| 2010/0270506 A1 | 10/2010 | Goetsch | |
| 2010/0281878 A1 | 11/2010 | Wormser | |
| 2010/0282079 A1 | 11/2010 | Boerrigter | |
| 2010/0287835 A1 | 11/2010 | Reiling | |
| 2010/0287836 A1 | 11/2010 | Robinson | |
| 2010/0292350 A1 | 11/2010 | Robinson | |
| 2010/0292417 A1 | 11/2010 | Nesterenko | |
| 2010/0294642 A1 | 11/2010 | Datta | |
| 2010/0300112 A1 | 12/2010 | Hannemann | |
| 2010/0305374 A1 | 12/2010 | Iaccino | |
| 2010/0311923 A1 | 12/2010 | Sato | |
| 2010/0317077 A1 | 12/2010 | Gaddy | |
| 2010/0320121 A1 | 12/2010 | Bauman | |
| 2010/0324157 A1 | 12/2010 | Bauman | |
| 2010/0329963 A1 | 12/2010 | Sceats | |
| 2010/0331502 A1 | 12/2010 | Hecker | |
| 2010/0331592 A1 | 12/2010 | Sangar | |
| 2011/0009501 A1 | 1/2011 | Ernst | |
| 2011/0021796 A1 | 1/2011 | Saebo | |
| 2011/0021857 A1 | 1/2011 | Cao | |
| 2011/0027170 A1 | 2/2011 | Lee | |
| 2011/0031439 A1 | 2/2011 | Sirdeshpande | |
| 2011/0034741 A1 | 2/2011 | Sherman | |
| 2011/0034746 A1 | 2/2011 | Koster | |

(56) References Cited

U.S. PATENT DOCUMENTS

| | | |
|---|---|---|
| 2011/0035990 A1 | 2/2011 | Kammerloher |
| 2011/0036014 A1 | 2/2011 | Tsangaris |
| 2011/0042620 A1 | 2/2011 | Singh |
| 2011/0042621 A1 | 2/2011 | Price |
| 2011/0054049 A1 | 3/2011 | Lambert |
| 2011/0054232 A1 | 3/2011 | Sangar |
| 2011/0059497 A1 | 3/2011 | Andersen |
| 2011/0062012 A1 | 3/2011 | Robinson |
| 2011/0062721 A1 | 3/2011 | Sirdeshpande |
| 2011/0062722 A1 | 3/2011 | Sirdeshpande |
| 2011/0064648 A1 | 3/2011 | Preston |
| 2011/0071264 A1 | 3/2011 | Nesterenko |
| 2011/0073687 A1 | 3/2011 | Makino |
| 2011/0077441 A1 | 3/2011 | Iaccino |
| 2011/0078951 A1 | 4/2011 | Blasiak |
| 2011/0085962 A1 | 4/2011 | Harris |
| 2011/0088550 A1 | 4/2011 | Tirio |
| 2011/0088896 A1 | 4/2011 | Preston |
| 2011/0088897 A1 | 4/2011 | Raman |
| 2011/0091394 A1 | 4/2011 | Abelyan |
| 2011/0091600 A1 | 4/2011 | Abelyan |
| 2011/0091602 A1 | 4/2011 | Abelyan |
| 2011/0091608 A1 | 4/2011 | Abelyan |
| 2011/0091617 A1 | 4/2011 | Abelyan |
| 2011/0091628 A1 | 4/2011 | Abelyan |
| 2011/0091629 A1 | 4/2011 | Abelyan |
| 2011/0091630 A1 | 4/2011 | Abelyan |
| 2011/0091633 A1 | 4/2011 | Abelyan |
| 2011/0091634 A1 | 4/2011 | Abelyan |
| 2011/0091635 A1 | 4/2011 | Abelyan |
| 2011/0091637 A1 | 4/2011 | Abelyan |
| 2011/0092684 A1 | 4/2011 | Abelyan |
| 2011/0097673 A1 | 4/2011 | Forret |
| 2011/0110849 A1 | 5/2011 | Siemons |
| 2011/0113779 A1 | 5/2011 | Polvi |
| 2011/0118425 A1 | 5/2011 | Nesterenko |
| 2011/0118518 A1 | 5/2011 | Nesterenko |
| 2011/0120266 A1 | 5/2011 | Burgler |
| 2011/0120560 A1 | 5/2011 | Proll |
| 2011/0123423 A1 | 5/2011 | Ciambelli |
| 2011/0123432 A1 | 5/2011 | Waycuilis |
| 2011/0124927 A1 | 5/2011 | Stites |
| 2011/0130271 A1 | 6/2011 | Wagner |
| 2011/0136213 A1 | 6/2011 | Stewart |
| 2011/0146155 A1 | 6/2011 | Bentzen |
| 2011/0146978 A1 | 6/2011 | Perlman |
| 2011/0146979 A1 | 6/2011 | Wallace |
| 2011/0152454 A1 | 6/2011 | Devisme |
| 2011/0155669 A1 | 6/2011 | Pan et al. |
| 2011/0159165 A1 | 6/2011 | Nair |
| 2011/0162275 A1 | 7/2011 | Hladun |
| 2011/0167713 A1 | 7/2011 | Quignard |
| 2011/0173836 A1 | 7/2011 | Orr |
| 2011/0174203 A1 | 7/2011 | Salatino |
| 2011/0176968 A1 | 7/2011 | Fan |
| 2011/0196183 A1 | 8/2011 | Nesterenko |
| 2011/0197791 A1 | 8/2011 | Landreth |
| 2011/0206594 A1 | 8/2011 | Singh |
| 2011/0207061 A1 | 8/2011 | Cantwell |
| 2011/0210292 A1 | 9/2011 | Ariyapadi |
| 2011/0213188 A1 | 9/2011 | Agblevor |
| 2011/0214309 A1 | 9/2011 | Ness |
| 2011/0214425 A1 | 9/2011 | Lang |
| 2011/0217210 A1 | 9/2011 | Katoh |
| 2011/0218372 A1 | 9/2011 | Waycuilis |
| 2011/0218374 A1 | 9/2011 | Waycuilis |
| 2011/0219770 A1 | 9/2011 | Minhas |
| 2011/0219802 A1 | 9/2011 | Minhas |
| 2011/0220548 A1 | 9/2011 | Roux |
| 2011/0220744 A1 | 9/2011 | Zhao |
| 2011/0224391 A1 | 9/2011 | Hagadorn |
| 2011/0230629 A1 | 9/2011 | Mihan |
| 2011/0232305 A1 | 9/2011 | Minhas |
| 2011/0236291 A1 | 9/2011 | Lang |
| 2011/0240923 A1 | 10/2011 | Sarkar |
| 2011/0245355 A1 | 10/2011 | Loosdrecht |
| 2011/0245444 A1 | 10/2011 | Miller |
| 2012/0094364 A1 | 4/2012 | Lali et al. |
| 2012/0258029 A1 | 10/2012 | Wilson et al. |
| 2012/0316955 A1 | 12/2012 | Panguluri et al. |
| 2013/0291721 A1 | 11/2013 | Silverman et al. |
| 2014/0161697 A1 * | 6/2014 | Leta et al. ............ 423/228 |

FOREIGN PATENT DOCUMENTS

| | | | |
|---|---|---|---|
| CN | 101970938 | 2/2011 | |
| FR | 2152666 A1 * | 4/1973 | ............ B01D 53/50 |
| GB | 2167397 A * | 5/1986 | ......... B01D 53/1425 |
| WO | WO 02/06637 | 1/2002 | |
| WO | WO 2009/026637 | 3/2009 | |
| WO | WO 2011016906 A2 * | 2/2011 | ......... B01D 53/1456 |

OTHER PUBLICATIONS

International Preliminary Report on Patentability for International (PCT) Patent Application No. PCT/US2013/036159, mailed Oct. 23, 2014 12 pages.

International Preliminary Report on Patentability for International (PCT) Patent Application No. PCT/US2013/060721, mailed Apr. 2, 2015 15 pages.

Official Action for U.S. Appl. No. 13/444,119, mailed Mar. 13, 2015, 7 pages.

Official Action for U.S. Appl. No. 13/444,119, mailed Apr. 15, 2015, 8 pages.

Official Action for U.S. Appl. No. 13/861,183, mailed Feb. 20, 2015, 5 pages.

Official Action for U.S. Appl. No. 13/861,183, mailed Apr. 13, 2015, 8 pages.

Choi et al., "Adsorbent Materials for Carbon Dixoide Capture from Large Anthropogenic Point Sources," Chem SUS Chem, 2009, vol. 2(9), pp. 796-854.

Drage et al, "Development of Adsorbent Technologies for Post Combustion $CO_2$ Capture," Energy Procedia, 2009, vol. 1, pp. 881-884.

Gray et al., "Parametric Study of Solid Amine Sorbents for the Capture of Carbon Dioxide," Energy & Fuels, 2009, vol. 23, pp. 4840-4844.

Gray et al., "Systematic Design of Immobilized Solid Amine Sorbents for the Capture of Carbon Dioxide," Sixth Annual Conference on Carbon Capture and Sequestration, Pittsburgh, PA, May 2007.

Samanta et al., "Post-Combustion $CO_2$ Capture Using Solid Sorbents-A Review," Ind. Eng. Chem. Res., 2012, vol. 54(4), pp. 1438-1463.

Sjostrom et al., "Evaluation of Solid Sorbents as a Retrofit Technology of $CO_2$ Capture," Fuel, 2010, vol. 89, pp. 1298-1306.

Prior Art Search for U.S. Appl. No. 13/444,119, filed Oct. 11, 2011, 214 pages.

International Search Report and Written Opinion for International (PCT) Patent Application No. PCT/US12/33016, mailed Jul. 27, 2012 9 pages.

International Preliminary Report on Patentability for International (PCT) Patent Application No. PCT/US12/33016, mailed Oct. 24, 2013, 7 pages.

International Search Report and Written Opinion for International (PCT) Patent Application No. PCT/US2013/036159, mailed Sep. 18, 2013 14 pages.

International Search Report and Written Opinion for International (PCT) Patent Application No. PCT/US2013/060721, mailed Feb. 4, 2014 16 pages.

Notice of Allowance for U.S. Appl. No. 13/444,119, mailed Sep. 17, 2015 5 pages.

Official Action for U.S. Appl. No. 13/861,183, mailed Sep. 29, 2015 9 pages.

Official Action for Australian Patent Application No. 2013317997, dated Nov. 10, 2015, 3 pages.

* cited by examiner

METHOD AND SYSTEM TO RECLAIM FUNCTIONAL SITES ON A SORBENT CONTAMINATED BY HEAT STABLE SALTS

CROSS REFERENCE TO RELATED APPLICATION

The present application claims the benefits of U.S. Provisional Application Ser. No. 61/703,591, filed Sep. 20, 2012, entitled "Method to Reclaim Functional Sites on a CO2 Sorbent That Have Formed Heat Stable Salts with an Acid Gas", which is incorporated herein by this reference in its entirety.

Cross-reference is made to U.S. application Ser. No. 13/444,119, filed Apr. 11, 2012, and Ser. No. 13/861,183, filed Apr. 11, 2013, each of which is incorporated herein by this reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. DE-FE0004343 awarded by the U.S. Department of Energy.

FIELD

The disclosure relates generally to waste gas treatment and particularly to recycle of sorbents used in waste gas treatment.

BACKGROUND $CO_2$ capture and sequestration is one of the only feasible means for significantly reducing $CO_2$ emissions from coal-fired power plants. One promising method of carrying out $CO_2$ capture is the use of dry adsorbents in a temperature swing process. Potential sorbents are being invented and evaluated extensively in the industry. One of the most common types of solid adsorbents are those that are functionalized with an amine.

Although sorbents that utilize an amine have demonstrated promising traits related to $CO_2$ capture, the amines will often react with $SO_2$ or other acid gases commonly present in flue gas to form heat stable salts. If the heat stable salt sites cannot be reclaimed or regenerated then the sorbent used in a commercial process will need to be prematurely replaced due to loss of functionality. This could result in significantly increased operational costs for $CO_2$ capture systems. It is commonly not feasible to replace only the sorbent that has formed a significant amount of heat stable salts.

A need therefore exists in the art for an amine-based sorbent having a longer working life cycle, superior degradation characteristics, and/or superior functional site regeneration characteristics.

SUMMARY

These and other needs are addressed by the various aspects, embodiments, and configurations of the present disclosure. The present disclosure is directed to a method and system by which sorbents, particularly amine-based sorbents, can be cleansed of heat stable salts, without negatively or adversely impacting the sorbent structure or the utility of its functional sites.

The disclosure is directed to a method that can include the steps:

(a) receiving a gas stream, which includes a target gas component and one or more acid gases different from the target gas component;

(b) contacting the gas stream with a sorbent to remove some or all of the target gas component to form a purified gas stream and a loaded sorbent, the sorbent also removing a portion of the acid gas(es);

(c) removing most or all of the target gas component from the loaded sorbent to form a lean sorbent, the lean sorbent still including most or all of the acid gas(es) and/or a salt thereof collected by the sorbent from the gas stream; and (d) contacting the lean sorbent with a regeneration solution to remove most or all of the acid gas(es) and/or salt(s) thereof and form a fully treated sorbent for recycle.

The disclosure is directed to a system that can include:

(a) a gas component separator configured to (a) receive a gas stream including a target gas component and one or more acid gas(es) different from the target gas component, and (b) contact the gas stream with a sorbent to remove some or all of the target gas component to form a purified gas stream and a loaded sorbent, the loaded sorbent also removing some or all of the acid gas(es);

(b) a sorbent regenerator configured to remove most or all of the target gas component from the loaded sorbent to form a lean sorbent, which still includes most or all of the acid gas(es) and/or a salt thereof; and (c) a regeneration vessel configured to contact the lean sorbent with a regeneration solution to remove most or all of the acid gas(es) and/or salt(s) thereof and form a fully treated sorbent for recycle to the gas component separator.

The target gas component can be a carbon oxide.

The acid gas can be one or more of a sulfur oxide, a nitrogen oxide and hydrogen sulfide.

The sorbent can be in the form of a solid.

The sorbent can be an amine-base sorbent.

The regeneration solution can include a base.

The base can be one or more of an alkali or alkaline earth metal carbonate, an alkali or alkaline earth metal hydroxide, an alkoxide, a metal oxide, ammonia, a metal amine, a carboxylate, a phosphine, an ether, a ketone, an alkene, and $CH_3^-$.

The regeneration solution commonly has a pH of at least about pH 10.

The acid gas can include $SO_2$.

The target gas component is $CO_2$. Most or all of the $CO_2$ in the gas stream can be removed by the sorbent.

$CO_2$ can be removed from the loaded sorbent by one or more of a pressure swing, temperature swing, and combination thereof.

The bonds between the between adjacent sorbent components and between the sorbent component and an adjacent sorbent substrate can be stronger than bonds between the sorbent component and the target gas component and between the sorbent component and the acid gas and/or salt thereof.

The regeneration solution normally does not significantly impact the strengths of the bonds between the between adjacent sorbent components and between the sorbent component and an adjacent sorbent substrate.

After contact of the lean sorbent with the regeneration solution, the sorbent can be contacted with a wash solution to remove any deposit on the sorbent after contact with the regeneration solution.

The system can include a tangible and non-transient computer readable medium including microprocessor readable and executable instructions that, when executed, perform operations including:

determine a concentration of a target gas component and/or an acid gas in a gas stream and/or purified gas stream and, when a determined relationship involving the determined concentration of the target gas component and/or acid gas in the gas stream and/or purified gas stream is deemed to exist, cause the following sub-operations to be performed;

(a) removing most or all of the target gas component from the loaded sorbent to form a lean sorbent, the lean sorbent still including most or all of the acid gas(es) and/or a salt thereof; and (b) contacting the lean sorbent with a regeneration solution to remove most or all of the acid gas(es) and/or a salt thereof and form a fully treated sorbent for recycle.

The instructions, when executed, can select between first and second operating modes of the system based on whether the determined relationship is deemed to exist. In the first operating mode, the gas stream passes through a first gas component separator but not a second gas component separator, a first sorbent used by the first gas component separator is not regenerated, and a second sorbent used by the second gas component separator is undergoing regeneration. In the second operating mode, the gas stream passes through the second gas component separator but not the first gas component separator, the second sorbent used by the second gas component separator is not regenerated, and the first sorbent used by the first gas component separator is undergoing regeneration.

The present disclosure can provide a number of advantages depending on the particular configuration. It can provide a sorbent, particularly an amine-based sorbent, having a longer working life cycle, superior degradation characteristics, and/or superior functional site regeneration characteristics. It can provide a method to wash amine based sorbents containing heat stable acid and salt deposits. It can decrease the frequency of sorbent replacement in a $CO_2$ capture system by recovering functional sites otherwise made unusable by the formation of heat stable acid and/or salt complexes. It can be less expensive than replacing poisoned sorbent, which often requires replacement of the entire sorbent. By offering a method to wash the solution and remove the heat stable salts, the disclosure can substantially lower operating costs for an amine-based sorbent CO2 capture system.

These and other advantages will be apparent from the disclosure of the aspects, embodiments, and configurations contained herein.

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Absorption" is the incorporation of a substance in one state into another of a different state (e.g. liquids being absorbed by a solid or gases being absorbed by a liquid). Absorption is a physical or chemical phenomenon or a process in which atoms, molecules, or ions enter some bulk phase-gas, liquid or solid material. This is a different process from adsorption, since molecules undergoing absorption are taken up by the volume, not by the surface (as in the case for adsorption).

"Adsorption" is the adhesion of atoms, ions, biomolecules, or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. Similar to surface tension, adsorption is generally a consequence of surface energy. The exact nature of the bonding depends on the details of the species involved, but the adsorption process is generally classified as physisorption (characteristic of weak van der Waals forces)) or chemisorption (characteristic of covalent bonding). It may also occur due to electrostatic attraction.

An "acid" is a chemical substance having the ability to react with bases and certain metals (like calcium) to form salts. There are three common definitions for acids: the Arrhenius definition, the Brønsted-Lowry definition, and the Lewis definition. The Arrhenius definition defines acids as substances which increase the concentration of hydrogen ions ($H^+$), or more accurately, hydronium ions ($H_3O^+$), when dissolved in water. The Brønsted-Lowry definition is an expansion: an acid is a substance which can act as a proton donor. By this definition, any compound which can easily be deprotonated can be considered an acid. Examples include alcohols and amines which contain O—H or N—H fragments. A Lewis acid is a substance that can accept a pair of electrons to form a covalent bond. Examples of Lewis acids include all metal cations, and electron-deficient molecules such as boron trifluoride and aluminium trichloride.

"Acid gas" refers to any type of gas or gaseous mixture which forms an acidic compound when mixed with water. The most common types of acid gases are hydrogen sulfide ($H_2S$), sulfur oxides ($SO_x$) (which can form sulfuric acid when mixed with water), nitric oxides ($NO_x$) (which can form nitric acid when mixed with water), and carbon monoxide (CO) and/or carbon dioxide ($CO_2$) (which can form carbonic acid when mixed with water).

An "alkene", "olefin", or "olefin" is an unsaturated chemical compound containing at least one carbon—carbon double bond.

"Amines" are organic compounds and functional groups that contain a basic nitrogen atom with a lone pair Amines are derivatives of ammonia, wherein one or more hydrogen atoms have been replaced by a substituent such as an alkyl or aryl group.

Important amines include amino acids, biogenic amines, trimethylamine, and aniline. Inorganic derivatives of ammonia are also called amines, such as chloramine ($NClH_2$). Compounds with the nitrogen atom attached to a carbonyl of the structure R—CO—NR'R" are called amides and have different chemical properties from amines.

"Ash" refers to the residue remaining after complete combustion of the coal particles. Ash typically includes mineral matter (silica, alumina, iron oxide, etc.).

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_0$).

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

A "base" is a substance that reacts with acids to form salts and can promote certain chemical reactions (base catalysis). For a substance to be classified as an Arrhenius base, it must produce hydroxide ions in solution. Examples of Arrhenius bases are the hydroxides of the alkali and alkaline earth metals (NaOH, Ca(OH)$_2$, etc.). In the Brønsted-Lowry acid-base theory, a base is a substance that can accept hydrogen ions (H$^+$)—otherwise known as protons. In the Lewis model, a base is an electron pair donor. Bases can be thought of as the chemical opposite of acids. Bases and acids are seen as opposites because the effect of an acid is to increase the hydronium (H$_3$O$^+$) concentration in water, whereas bases reduce this concentration. A reaction between an acid and base is called neutralization. In a neutralization reaction, an aqueous solution of a base reacts with an aqueous solution of an acid to produce a solution of water and salt in which the salt separates into its component ions.

"Biomass" refers to biological matter from living or recently living organisms. Examples of biomass include, without limitation, wood, waste, (hydrogen) gas, seaweed, algae, and alcohol fuels. Biomass can be plant matter grown to generate electricity or heat. Biomass also includes, without limitation, plant or animal matter used for production of fibers or chemicals. Biomass further includes, without limitation, biodegradable wastes that can be burnt as fuel but generally excludes organic materials, such as fossil fuels, which have been transformed by geologic processes into substances such as coal or petroleum. Industrial biomass can be grown from numerous types of plants, including miscanthus, switchgrass, hemp, corn, poplar, willow, sorghum, sugarcane, and a variety of tree species, ranging from eucalyptus to oil palm (or palm oil).

"Carbonaceous" refers to a carbon-containing material, particularly a material that is substantially rich in carbon.

A "carbonate" is a carbonate is a salt of carbonic acid, characterized by the presence of the carbonate ion, CO$_3^{2-}$, or an ester of carbonic acid, an organic compound containing the carbonate group C(=O)(O—)$_2$.

"Coal" refers to a combustible material formed from prehistoric plant life. Coal includes, without limitation, peat, lignite, sub-bituminous coal, bituminous coal, steam coal, anthracite, and graphite. Chemically, coal is a macromolecular network comprised of groups of polynuclear aromatic rings, to which are attached subordinate rings connected by oxygen, sulfur, and aliphatic bridges.

A "composition" refers to one or more chemical units composed of one or more atoms, such as a molecule, polyatomic ion, chemical compound, coordination complex, coordination compound, and the like. As will be appreciated, a composition can be held together by various types of bonds and/or forces, such as covalent bonds, metallic bonds, coordination bonds, ionic bonds, hydrogen bonds, electrostatic forces (e.g., van der Waal's forces and London's forces), and the like.

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

An "ether" is a class of organic compounds that contain an ether group—an oxygen atom connected to two alkyl or aryl groups—of general formula R—O—R'.

The terms "determine", "calculate" and "compute," and variations thereof, as used herein, are used interchangeably and include any type of methodology, process, mathematical operation or technique.

"Flue-gas desulfurization" or "FGD" refers to a set of technologies to remove gas-phase sulfur dioxide (SO$_2$), particularly from exhaust flue gases of fossil-fuel power plants and from the emissions of other sulfur oxide emitting processes.

"High alkali coals" refer to coals having a total alkali (e.g., calcium) content of at least about 20 wt. % (dry basis of the ash), typically expressed as CaO, while "low alkali coals" refer to coals having a total alkali content of less than 20 wt. % and more typically less than about 15 wt. % alkali (dry basis of the ash), typically expressed as CaO.

"High iron coals" refer to coals having a total iron content of at least about 10 wt. % (dry basis of the ash), typically expressed as Fe$_2$O$_3$, while "low iron coals" refer to coals having a total iron content of less than about 10 wt. % (dry basis of the ash), typically expressed as Fe$_2$O$_3$. As will be appreciated, iron and sulfur are typically present in coal in the form of ferrous or ferric carbonates and/or sulfides, such as iron pyrite.

"High sulfur coals" refer to coals having a total sulfur content of at least about 1.5 wt. % (dry basis of the coal) while "medium sulfur coals" refer to coals having between about 1.5 and 3 wt. % (dry basis of the coal) and "low sulfur coals" refer to coals typically having a total sulfur content of less than about 1.5 wt. % (dry basis of the coal), more typically having a total sulfur content of less than about 1.0 wt. %, and even more typically having a total sulfur content of less than about 0.8 wt. % of the coal (dry basis of the coal).

A "hydroxide" is a diatomic anion with chemical formula OH$^-$. It includes an oxygen and a hydrogen atom held together by a covalent bond, and carries a negative electric charge.

A "ketone" is an organic compound with the structure RC(=O)R', where R and R' can be a variety of carbon-containing substituents. Ketones feature a carbonyl group (C=O) bonded to two other carbon atoms.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

"Particulate" refers to fine particles, such as fly ash, unburned carbon, soot and fine process solids, typically entrained in a gas stream.

The phrase "ppmw X" refers to the parts-per-million, based on weight, of X alone. It does not include other substances bonded to X.

The phrase "ppmv X" refers to the parts-per-million, based on volume, of X alone. It does not include other substances bonded to X.

A "phosphine" is the compound with the chemical formula $PH_3$. Phosphines are also a group of organophosphorus compounds with the formula $R_3P$(R=organic derivative).

A "pyridine" is a basic heterocyclic organic compound with the chemical formula $C_5H_5N$. It is structurally related to benzene, with one methine group (=CH—) replaced by a nitrogen atom. The pyridine ring occurs in many important compounds, including, without limitation, azines and the vitamins niacin and pyridoxal.

The terms "remove" or "removing" include the sorption, precipitation, adsorption, absorption, conversion, deactivation, decomposition, degradation, neutralization, and/or killing of a target material.

A "scrubber" or "scrubber system" is an air pollution control device that can be used to remove some particulates and/or gases from industrial exhaust streams. Traditionally, the term "scrubber" has referred to a pollution control device to "wash out" acid gases in an exhaust stream, such as a flue gas.

"Separating" and cognates thereof refer to setting apart, keeping apart, sorting, removing from a mixture or combination, or isolating. In the context of gas mixtures, separating can be done by many techniques, including electrostatic precipitators, baghouses, scrubbers, and heat exchange surfaces.

"Soluble" refers to materials that readily dissolve in water. For purposes of this invention, it is anticipated that the dissolution of a soluble compound would necessarily occur on a time scale of minutes rather than days. For the compound to be considered to be soluble, it is necessary that it has a significantly high solubility product such that upwards of 5 g/L of the compound will be stable in solution.

A "sorbent" is a material that sorbs another substance; that is, the material has the capacity or tendency to take it up by sorption.

"Sorb" and cognates thereof mean to take up a liquid or a gas by sorption.

"Sorption" and cognates thereof refer to adsorption and absorption, while desorption is the reverse of adsorption.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Process Overview

Figure 1:
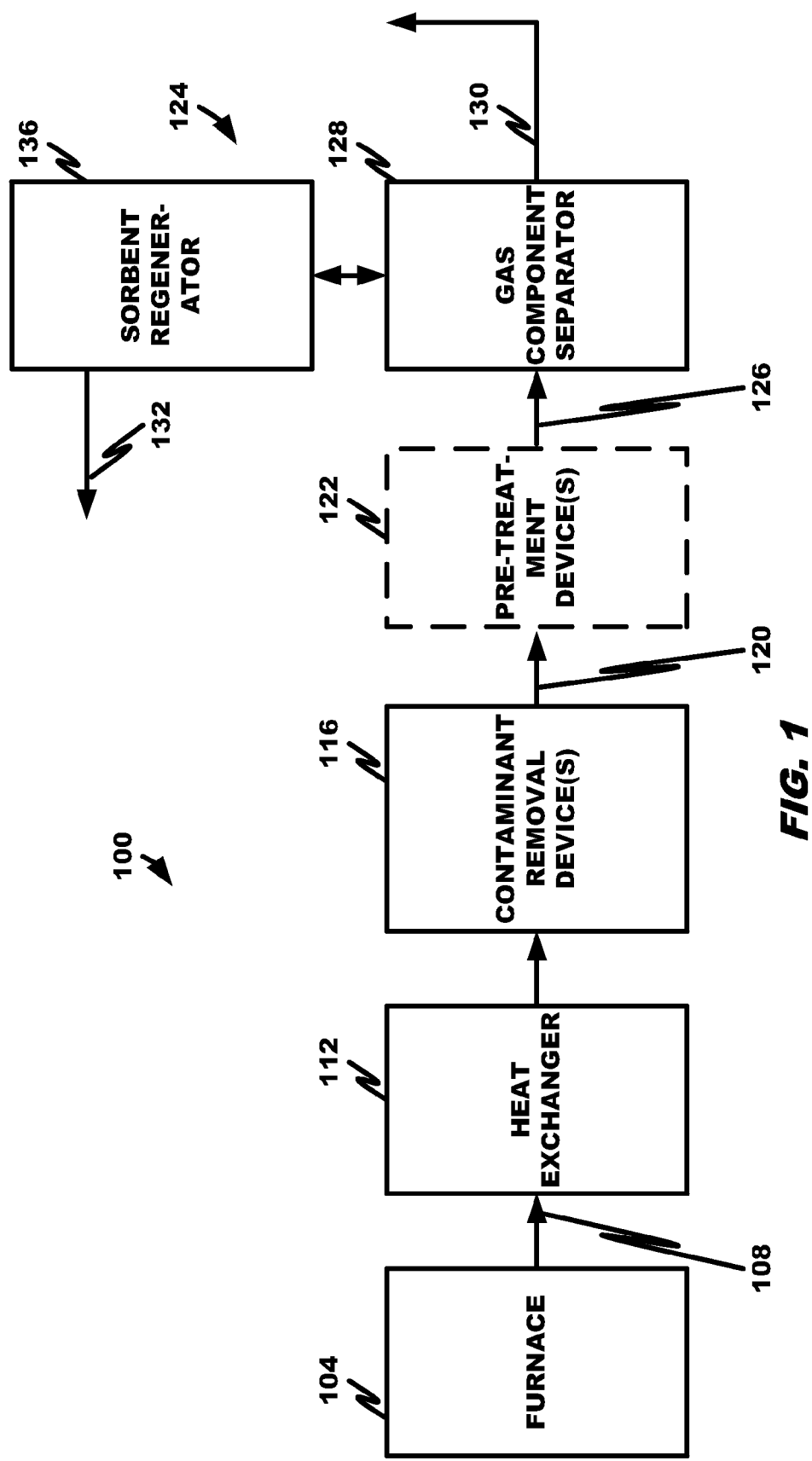
FIG. 1 is a block diagram of a typical waste gas stream treatment with an embodiment of the disclosure downstream of the contaminant removal devices.

The current disclosure is directed to the use of an aqueous regeneration solution to remove heat stable acid gas and/or other acid and/or salt components from a sorbent used to remove a target component from an acid-containing gas stream. The target component can be a contaminant, byproduct, product, or other substance targeted for removal. The gas, for example, can be a contaminated waste gas generated by a gas evolving facility, such as a smelter, autoclave, roaster, steel foundry, steel mill, cement kiln, power plant, waste incinerator, boiler, and other contaminated gas stream-producing industrial facilities. Although the target contaminant is typically evolved by combustion, it may be evolved by other oxidation and/or reduction reactions, such as roasting, autoclaving, and other thermal processes that expose contaminant-containing materials to elevated temperatures.

While not wishing to be bound by any theory, it is believed that the acid gas can form a heat stable salt with the functional sites on the sorbent. For amine-based sorbents, it is believed that the heat stable salt is a complex between the amine and the acid molecule. Water vapor may be involved in complex formation. The regeneration solution, which can be an aqueous base solution, can treat the sorbent to reclaim functional or active sites saturated with the heat stable salts. It is believed that the base in the regeneration solution neutralizes the acid to form at least one weakly basic and/or weakly acidic salt(s), which have a much weaker bond to the active sites on the sorbent and may be removed effectively by a water wash.

In one application, the sorbent is an amine-based sorbent, the gas component targeted by the sorbent is a carbon oxide (e.g., carbon monoxide and/or dioxide) contaminant, and the acid gas that can cause fouling of the sorbent is a sulfur oxide (e.g., $SO_x$), nitrogen oxide (e.g., $NO_x$), and/or hydrogen sulfide (which forms hydrosulfuric or sulthydric acid in water). Commonly, the amine-based sorbent is utilized in a post-combustion environment. Generally the amine-based sorbent is used as an active component of a flue gas sorbent system. Typical applications include post-combustion flue gas in a coal-fired power plant system, though any post-combustion or gas clean-up system with carbon oxide- and acid gas-containing mixtures can be treated in the application.

In one application, the sorbent is an activated carbon, zeolite, clay (or phyllosilicate material) (such as a kaolinite, montmorillonite-smectite, illite, and chlorite), and/or fly ash, the gas component targeted by the sorbent is a carbon oxide, elemental and/or speciated mercury, and the like, and the acid gas that can cause fouling of the sorbent is a sulfur oxide, nitrogen oxide, and/or hydrogen sulfide. As in the case of the prior application, the sorbent can be utilized in a post-combustion environment, e.g., as an active component of a flue gas sorbent system treating post-combustion flue gas in a coal-fired power plant system, though any post-combustion or gas clean-up system with carbon oxide- and acid gas-containing mixtures can be treated in the application.

In one application, the sorbent is an amine-based or other hydrocarbon collecting sorbent, the gas component targeted by the sorbent for recovery or removal is a hydrocarbon, and the acid gas is hydrogen sulfide. An exemplary gas treated by the sorbent is natural gas. Commonly, the sorbent is used to treat a gas produced by an underground formation or industrial facility. Generally, the sorbent is used as an active component in a produced gas purification system.

The sorbent can have other compositions depending on the targeted gas component. Examples include not only the sorbent compositions identified above but also metal-containing sorbents, particularly metal-organic sorbents. Typically, the metal(s) in the latter sorbent compositions are one or more metals from Groups 3B, 4B, 5B, 6B, 7B, 8, 1B, and 2B, more typically from Groups 8, 1B and 2B, and even more typically from Group 1B of the Periodic Table of Elements.

The Gas Treatment Process

FIG. 1 depicts an exemplary plant 100 for a coal-fired power plant, natural gas combined cycle power plant, co-production facility, biomass-fired power plant, waste incinerator, and the like. While the process is discussed with reference to removing carbon oxides from a contaminated gas stream, it is to be understood that the process may be used to regenerate sorbent collecting different target gas components in the same or other processes.

Turning to FIG. 1, a feed material, such as coal (e.g., high alkali coal, high iron coal, and/or high sulfur coal), is combusted in a furnace 104, which produces a gas stream 108. The gas stream 108 typically contains many impurities and/or contaminants, including acid gas(es), particulates, elemental and speciated mercury, uncombusted hydrocarbons (such as coal, ash, methane, propane, ethane, and the like), carbon oxides (CO and $CO_2$), water vapor, and the like. Any of these can be the target gas component.

A gas stream comprises typically at least about 1 vol % $CO_2$ and more typically at least about 5 vol % $CO_2$ and typically no more than about 15 vol % $CO_2$ and more typically no more than about 20 vol % $CO_2$. In certain applications however, a gas stream may comprise up to 60% $CO_2$, or up to 95% or more $CO_2$.

The gas stream 108 is passed through a heat exchanger 112 to transfer thermal energy to an oxygen-containing gas to be introduced into the furnace 104 and then through one or more contaminant removal device(s) 116 to remove selected contaminants, such as acid gas(es), particulates, and/or mercury. Common devices for removal of acid gas(es) include dry and wet scrubbers and FGD systems; for removal of particulates include electrostatic precipitators and baghouses; and for removal of mercury include additives, particularly powdered activated carbon and halogens.

The treated gas stream 120 is optionally passed through flue gas pre-treatment device(s) 122 to form a pre-treated gas stream 126. The gas pre-treatment device(s) 122 will be specific to the particular gas being treated. For example, it may be necessary to reduce further concentrations of other constituents, such as $SO_2$. In addition, it may be desirable to cool and/or increase the pressure of the gas. In some cases, cooling the gas or increasing the pressure could result in the condensation of water out of the gas phase. Additional moisture could be removed if desired, but it may not be necessary. The gas pressure must be, at a minimum, sufficient to overcome any pressure drop due to the $CO_2$ capture process.

Figure 2:
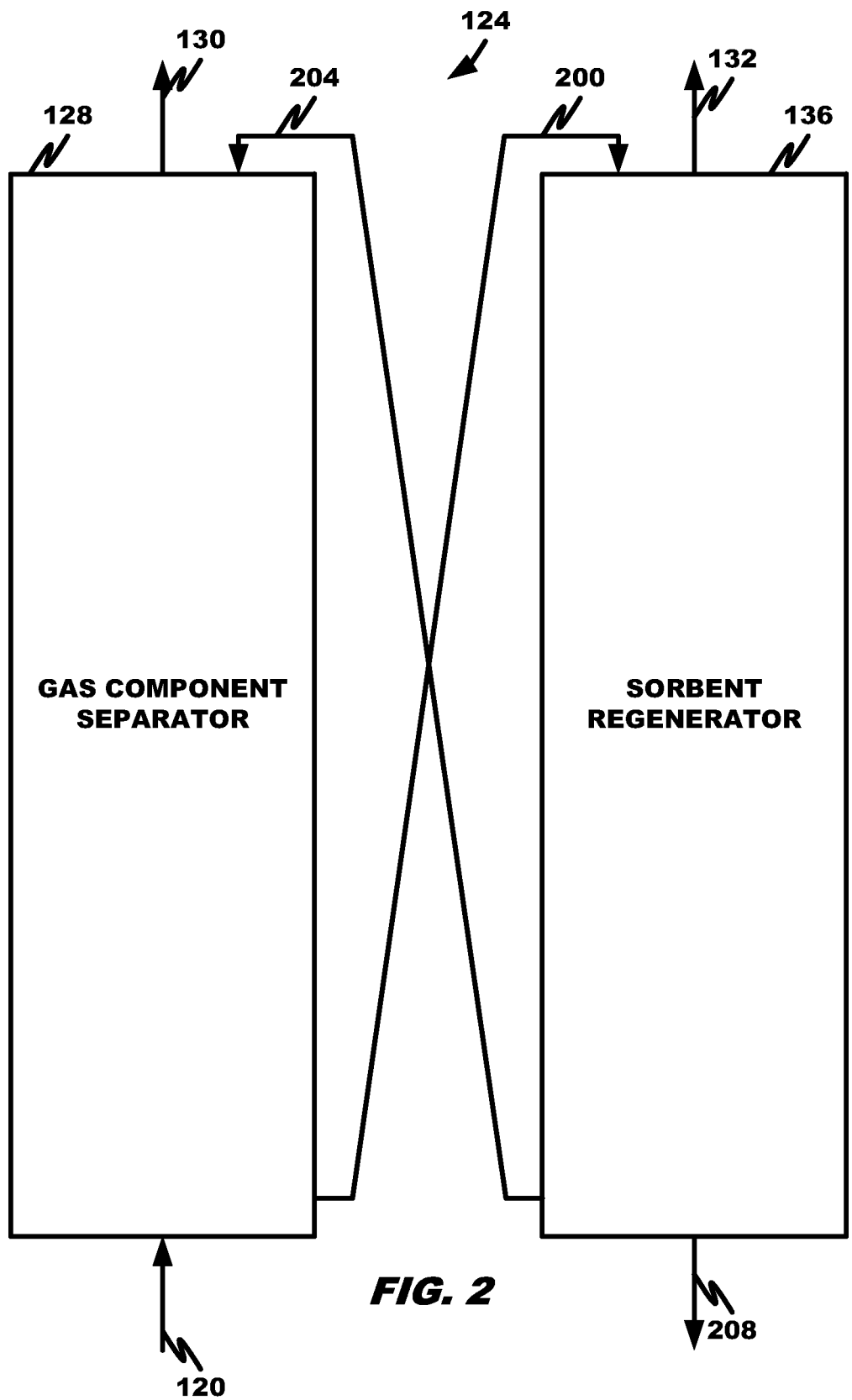
FIG. 2 is a block diagram of a separation system according to the disclosure.

With reference to FIGS. 1 and 2, the treated gas stream 120 (or pre-treated gas stream 126) is next introduced into a gas component separator 128 of the separation system 124 to remove commonly most, more commonly about 50% or more, and even more commonly about 85% or more of the $CO_2$ from the treated gas stream 120 (or pre-treated gas stream 126) and form a purified gas stream 130, a $CO_2$-rich product gas 132, and a $CO_2$ loaded sorbent 200. The $CO_2$ loaded sorbent 200 is introduced into a sorbent regenerator 136 for evolution of the sorbed gas constituent (i.e., $CO_2$) from the sorbent to form a $CO_2$ lean sorbent 204 for recycle to the gas component separator 128 (after heat stable salt removal as set forth below) and the $CO_2$-rich product gas 132.

FIG. 2 depicts a counter-current system where the treated gas stream 120 enters one side of the gas component separator 138 while the $CO_2$ lean sorbent 204 enters the opposite side. Typically and as shown in FIG. 2, the treated gas stream 120 and sorbent flow counter-currently; that is, the treated gas stream 120 flows upwards, while the lean sorbent 204 travels downwards. It is to be appreciated, however, that the other configurations are possible in which the treated gas stream 120 and sorbent flow co-currently.

The $CO_2$ can be evolved by any suitable mechanism, including pressure and/or temperature swing. In the former mechanism, a pressure differential exists between the operating pressures in the gas component separator 128 and the sorbent regenerator 136, which causes the $CO_2$ to enter the gas phase. In the case where pressure swing is utilized, the operating pressure in the gas component separator 128 is usually greater than the operating pressure in the sorbent regenerator 136. Relative to ambient pressure, the operating pressures can be positive or negative (e.g., under vacuum). In the latter mechanism, a temperature differential exists between the operating temperatures in the gas component separator 128 and the sorbent regenerator 136, which causes the $CO_2$ to enter the gas phase. Generally, the operating temperature in the gas component separator 128 is less than the operating temperature in the sorbent regenerator 136.

In one configuration, the sorbent regenerator 136 utilizes a change in temperature, total pressure, or partial pressure to regenerate the sorbent and release the $CO_2$. When a temperature increase is utilized to regenerate the sorbent in the regenerator, the temperature can be increased through direct, indirect, or a combination of direct and indirect heating. The heat input should be sufficient to address both the sensible heat required to change the temperature of the sorbent as well as overcome the enthalpy of reaction required to release the $CO_2$ and any other sorbed constituents, which may be endothermic. In one application, a sweep gas, either steam or a mixture of steam and $CO_2$, is injected into the sorbent regenerator 136. In one design, the gas component separator 128 and sorbent regenerator 136 each include plural staged fluidized beds. The $CO_2$ lean sorbent 204 can be extracted from the last stage (where $CO_2$ loading is lower than other stages). In another design, the gas component separator 128 and regenerator 136 each use a single fluidized bed.

The purified gas stream 130 commonly contains no more than about 1000 ppm, more commonly no more than about 2 vol %, and even more commonly no more than about 10 vol % $CO_2$. Because most of the other contaminants referenced above have been removed from the gas stream 108 by the contaminant removal device(s) 116 and optional pre-treatment device(s) 122, the purified gas stream 130 can be discharged into the atmosphere via a stack (not shown).

A $CO_2$-rich product gas 132 commonly contains most, more commonly about 75% or more, and even more commonly about 90% or more of the $CO_2$ removed from the treated gas stream 120. The $CO_2$-rich product gas 132 commonly has a relatively high purity of $CO_2$ with a relatively low impurity content. The $CO_2$-rich product gas 132 typically contains from about 1 vol % to about 99 vol %, more typically from about 25 vol % to about 95 vol %, and even more typically from about 50 vol % to about 90 vol. % $CO_2$ and from about 1000 ppm to about 90 vol %, more typically from about 1 vol % to about 50 vol %, and even more typically from about 5 vol % to about 15 vol. % water vapor. The balance of the $CO_2$-rich product gas 132 is comprised of impurities including molecular oxygen, nitrogen, and carbon monoxide.

In one application, an amine-based sorbent is used in the gas component separator 128 and therefore as an active component of a waste gas treatment system. Typical applications include post combustion flue gas in a coal fired power plant system, though any post-combustion or any gas clean up system with carbon dioxide and acid gas containing mixtures would be appropriate for the application. When placed into use, the amine-based sorbent system adsorbs flue gas contaminants, such as carbon dioxide ($CO_2$), sulfur dioxide ($SO_2$) and other acid gases. Preferably the amine-based sorbent system targets $CO_2$ collection. This is because other, often more inexpensive, systems exist for targeting other acid gases. Although it targets $CO_2$ collection, the amine-based sorbent will tend to collect the other acid gases remaining in the flue gas stream. The acid gases, in particular sulfur-based gases, will react with the amine-based sorbent to form heat stable salts. The formation of heat stable salts necessarily reduces capacity of the sorbent to collect $CO_2$. The acid gas, such as $SO_2$, binds to the amine functional group of the sorbent, and blocks reactive sites for $CO_2$ adsorption. Typically, when $CO_2$ collection capacity has reduced to an unacceptable level, the sorbent must be regenerated. Removing the heat stable salts from the amine-based sorbent enables reuse and recycle of the sorbent to capture further $CO_2$.

At least a portion of the sorbent 208 is therefore removed from the sorbent regenerator for removal of heat stable acid gas and/or other acid and/or salt components from the sorbent prior to recycle to the treated gas stream contacting operation. The further treated or fully regenerated sorbent can then be recycled as all or part of the lean sorbent 204 to the gas component separator 128.

The solid sorbent used in the gas component separator 128 is formulated to survive repeated thermal swing cycles and/or contact with the regeneration solution. "Survival" means that the solid sorbent not only substantially retains its ability to sorb the targeted gas component but also resists substantially loss of its solid mass. This generally requires the sorbent to have a stronger bond between sorbent components (e.g., substrate and amine functional groups) and/or between the sorbent component and any sorbent substrate than to the targeted gas component or heat stable acid and/or salt to be removed from the sorbent surface and/or active or functional sites.

For example, an amine-based sorbent will desirably have internal amine bonds to a sorbent substrate that are relatively stronger than the acid gas or salt-to-amine bonds (e.g., the $SO_2$-to-amine bonds), particularly at elevated temperatures and/or pressures of a temperature or pressure swing process. $SO_2$ can form relatively strong bonds with functional sites on an amine-based sorbent. The $SO_2$-to-amine bond can be stronger than the bonds between the amine and the sorbent substrate. This presents a challenge when attempting to desorb the $SO_2$ species, as the process can result in degradation or decomposition of the structure of the amine-based sorbent. This can be particularly problematical in thermal desorption of $SO_2$ from the amine-based sorbent in a temperature swing process. Often, the $SO_2$-to-amine bond is so strong that temperatures in excess of 180° C. are required to desorb the $SO_2$. At such elevated temperatures, the amine can thermally decompose, thereby resulting in a loss of the amine functional group from the sorbent substrate.

Figure 7:
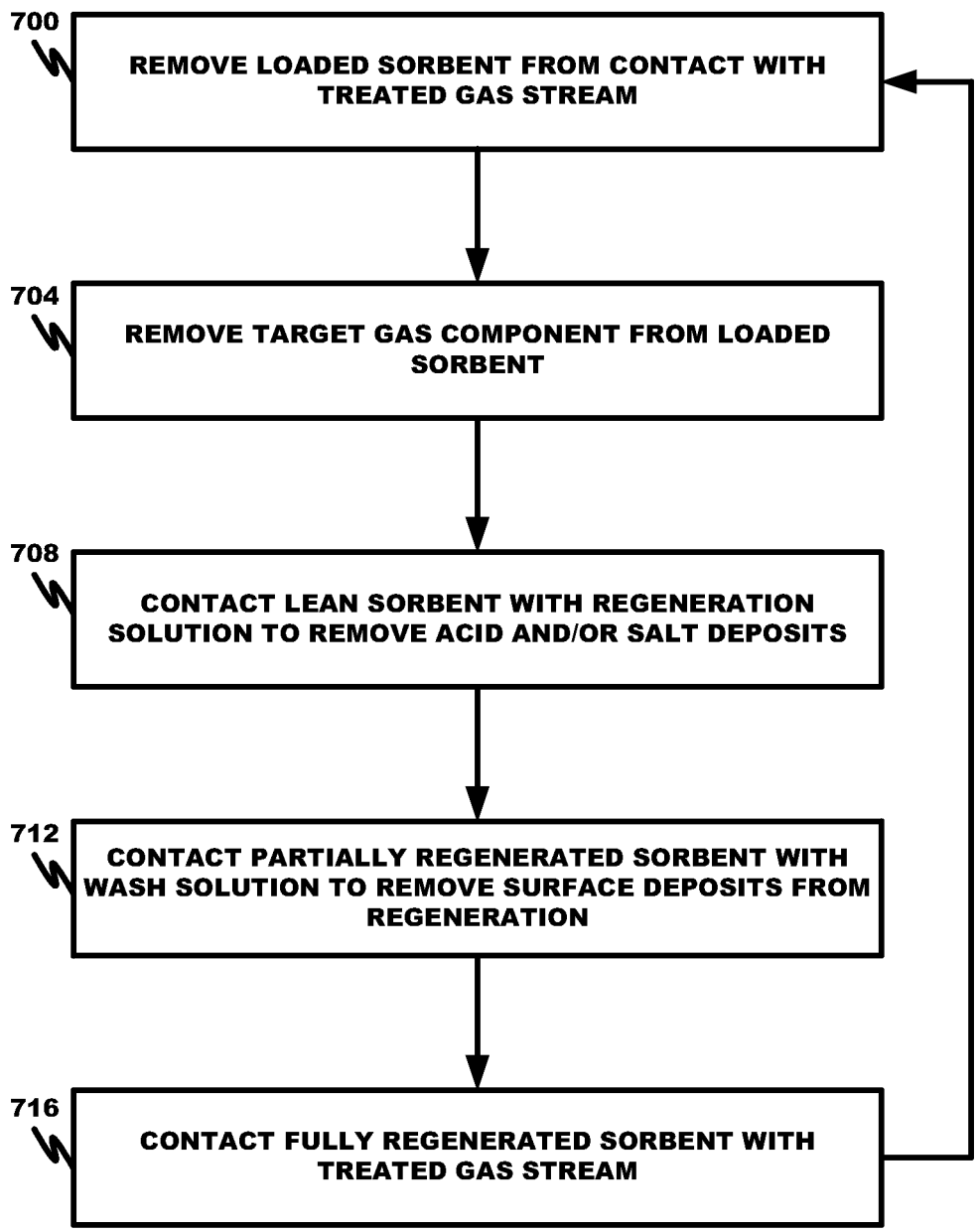
FIG. 7 is a flow chart of a regeneration process according to an embodiment of the disclosure.

Heat Stable Acid and Salt Species Removal from the Target Gas Component Lean Sorbent With reference to FIG. 7, the sorbent 200 is removed from contact with the treated gas stream 120 (step 700), the target gas component is removed from the loaded sorbent (step 704), before, during, or after target gas component removal from the sorbent 200, the target gas component lean sorbent is contacted with the regeneration solution to remove acid and/or salt deposits on the sorbent (step 708), the partially regenerated sorbent is contacted with the wash solution to remove surface deposits from step 708 (step 712), and the fully regenerated sorbent is again contacted with the treated gas stream 120 (step 716). The regeneration solution includes one or more bases to cause desorption and/or degradation of the heat stable acid and/or salt from the sorbent, and the wash solution is typically an aqueous solution to remove the base and/or derivative thereof (e.g., from reaction of the acid and/or salt with the base) from the active or functional sites of the sorbent.

The composition of the regeneration solution depends on the particular characteristics of the selected solid sorbent. The regeneration solution has substantially no adverse impact on the stability and/or strength of chemical and other bonds within the sorbent matrix. For unsupported and supported sorbents, the bonds between adjacent molecules of the sorbent material and between the sorbent material molecules and any substrate are substantially unaffected by contact with the regeneration solution.

Although any base may be employed, the effectiveness of the base depends on the sorbent composition. Particularly strong bases, such as superbases (such as Group 1 salts of carbanions, amides, and hydrides), can adversely impact one or both types of bonds within the sorbent matrix. Weak bases may be unable to cause acid and/or salt removal from the sorbent surface. Commonly, bases of intermediate strength are used. Exemplary bases include alkali and alkaline earth metal hydroxides, carbonates, and alkoxides, metal oxides, ammonia, metal amines, and carboxylates. Conjugate bases to the acid can be employed (e.g., halides, hydrogen sulfate ion, nitrate ions, water, sulfate ion, dihydrogen phosphate ion, acetate ion, hydrogen carbonate ion, hydrogen sulfide ion, hydrogen phosphate ion, ammonia, carbonate ion, phosphate ion, and hydroxide ion).

Because some amine-based sorbent formulations can be degraded over time due to adverse chemical reactions with the regeneration solution, preferred amine-based sorbents are formulated to withstand repeated acid gas and heat stable salt desorbing cycles, have sufficient thermal stability to withstand repeated thermal swing desorption cycles, and have sufficient structural stability to withstand repeated washing with the regeneration solution without suffering significant structural decomposition or reduction in target gas component capacity. Stated differently, the preferred amine-based sorbents have thermally and chemically stable bonds within the sorbent matrix that are stronger than the $SO_2$-to-amine bond.

Amine-based sorbents act as Lewis Bases to bind with $CO_2$, $SO_2$ and other molecules that are Lewis Acids. As such, stronger Lewis Bases may be used to out compete the amine-based sorbent for the $SO_2$ molecule and thus regenerate the sorbent using a variety of solvents or aqueous phase ions including but not limited to $OH^-$, $CH_3^-$, etc. Additional Lewis Bases include pyridines and its family of compounds, phosphines, water, ethers, ketones, and other compounds containing an available electron pair including organic compounds such as alkenes (ethylene, ethene, benzene, etc.)

In one application, a target gas component lean amine-based sorbent containing heat stable salts is exposed to aqueous hydrated lime. The aqueous hydrated lime reacts with the heat stable salts to form calcium sulfite ($CaSO_3$). The calcium sulfite can be oxidized to form gypsum. The resulting gypsum can be discarded into the outgoing gypsum pile at the power plant. After heat stable salts are removed from the amine-based sorbent, the amine-based sorbent can be reinserted into the waste sorbent system, and the resulting waste added into a revenue generating stream for the power plant.

The regeneration solution is an aqueous basic solution typically having a pH above pH 7, more typically at least about pH 8, more typically at least about pH 9, and even more typically at least about pH 12.

As will be appreciated, a wide range of basic aqueous solutions can be used as the regeneration solution. The above examples are representative only and are not intended to limit the scope of potential applications.

When properly formulated, the sorbent can operate in the preferred temperature region(s) necessary to promote heat stable salt desorption while withstanding decomposition of the sorbent.

The regeneration solution can reclaim active or functional sites saturated with heat stable acid and salt species. Typically, the regeneration solution removes at least about 50, more commonly at least about 70, and even more commonly at least about 80 mole % of the acid and salt species sorbed at the functional sites of the sorbent.

Following contact with the regeneration solution, the acid and/or salt at the active or functional sites of the target gas component lean sorbent are replaced by the base or a derivative thereof. To remove the base or base derivative from the active or functional sites, the regenerated sorbent is washed with a water wash solution. Typically, the wash solution removes at least about 70, more commonly at least about 80, and even more commonly at least about 90 mole % of the base and base derivative from the functional sites of the sorbent. The pH of the wash solution typically ranges from about pH 6 to about pH 8 and more typically from about pH 6.5 to about pH 7.5.

Commonly, regeneration and rinsing of the sorbent are executed at temperatures between about 0 and 100° C., and more preferably at temperatures between about 20 and 40° C.

By way of illustration and after removal of the target gas component from the amine-based sorbent, the target gas component lean amine-based sorbent containing heat stable acid and/or salts (typically from reaction with a nitrogen oxide or sulfur oxide in a flue gas stream) is first contacted with aqueous sodium carbonate ($Na_2CO_3$ (aq)). The heat stable salts, such as the complex formed by $SO_2$ and the amine based sorbent are broken down or degraded by reaction with the $Na_2CO_3$. Typically at least about 50% and more typically at least about 75% of the heat stable acid and/or salts are destroyed by this process. The amine-based sorbent, no longer containing heat stable salts, is rinsed with the wash solution to ensure no $Na_2CO_3$ remains on the sorbent (or that the sorbent is substantially free of $Na_2CO_3$ or a derivative thereof).

The regeneration solution may itself be regenerated and combined with fresh solution. It may be passed through a fine particle separator, such as a cyclone, filter, membrane, fine solids settling tank, decantation or wash circuit, and the like, to remove precipitates followed by contact with fresh base to raise the pH to the desired levels.

The pH of the wash solution may rise over time due to removal of base from the sorbent. To maintain the pH of the wash solution in the desired range, it may be contacted with an acid, such as an acid removed from the waste gas.

In any regeneration system, it may be important to remove, from the regeneration and/or wash solutions selected dissolved contaminants to avoid excessive build-up during solution recycle. Examples of such dissolved contaminants include, for example, selenium, the base, base derivatives, mercury, arsenic, chromium, and mixtures thereof. This can be done by treating the entire regeneration or wash solutions or simply a bleed stream thereof. Any suitable technique can be used to remove at least a portion, and typically at least most, of the dissolved contaminant, including precipitation, ion exchange, adsorption, absorption, electrolysis, membrane separation, neutralization, and the like.

Systems for Regenerating the Sorbent

Various systems can be used to contact the sorbent with the target gas component and regenerate and treat the loaded sorbent.

With reference to FIG. 2, sorbent 208 is removed (after removal of the sorbed target gas component in the sorbent regenerator 136) and regenerated and stripped of acid and/or salt deposits in a batch-type regeneration reactor vessel (not shown) where the regeneration process (in which the target gas component lean sorbent is contacted with the regeneration and wash solutions) is separated from the target gas component (e.g., $CO_2$) capture and removal processes. Some means of pneumatic, mechanical, or other conveying mechanism can transport the sorbent particles between the sorbent regenerator 136 and sorbent regeneration reaction vessel. In either configuration, the sorbent addition and extraction locations in the separator and/or regenerator are separated using one or more baffles.

Alternatively, the target gas component lean sorbent may be regenerated online in a continuous "polishing" process as the lean sorbent is passed from the sorbent regenerator 136, which facilitates removal of the sorbed target gas component (e.g., $CO_2$) from the sorbent, to the gas component separator 128, where the sorbent binds with target gas component in the treated gas stream 120 (or pre-treated gas stream 126).

Figure 3:
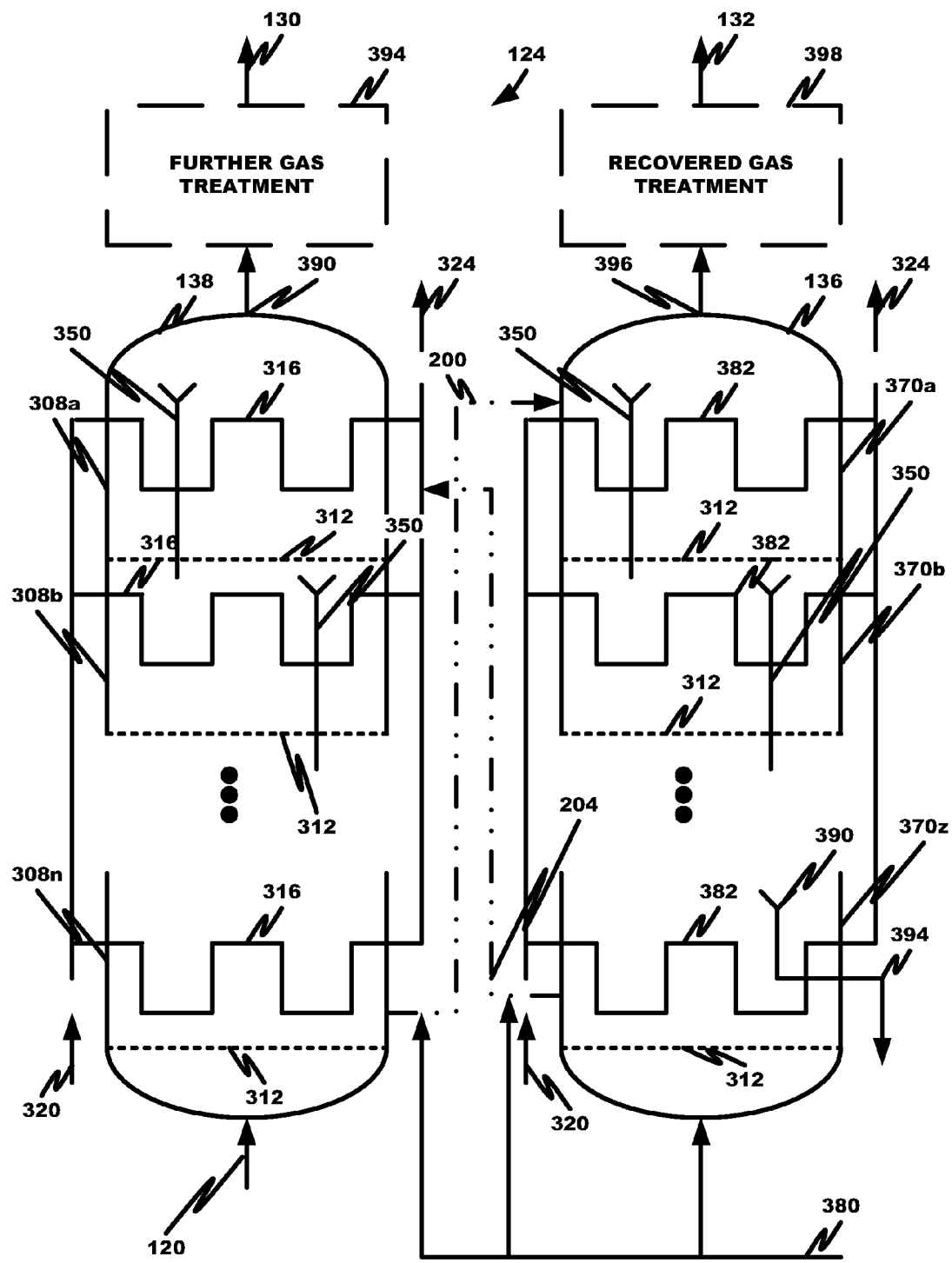
FIG. 3 is a block diagram of a separation system according to an embodiment of the disclosure.

A first example of this process will be discussed with reference to FIG. 3, which shows a staged fluidized bed reactor configuration. Staged fluidized beds can be used to approach counter current contacting (i.e., an infinite number of stages can result in counter current contacting).

The treated gas stream 120 enters a lower end of the fluidized bed separator 138 comprising first, second, . . . nth stages 308a-n. The fluidized sorbent beds are commonly staged in such a way that the targeted gas component (e.g., $CO_2$) removal may be distributed throughout the vessel. Each stage of the fluidized bed separator comprises a distributor 312 supporting a bed of sorbent particles and a cooling device 316. As the pre-treated gas stream 304 and sorbent particles are contacted, the targeted gas component in the pre-treated gas stream 304 will be sorbed on the sorbent. Since the adsorption reaction between the targeted gas component and sorbent is commonly exothermic, the cooling device 316 controls any temperature increase, and attempts to maintain a substantially constant temperature within the bed and across the height of the separator 138, by removing heat.

Although any suitable cooling mechanism may be employed, the cooling device 316 is generally an indirect heat exchanging device that moves a cooling fluid through the bed 400 to maintain a selected temperature substantially uniformly throughout the bed volume. The cooling device 316 depicted in FIG. 3 is an indirect heat exchanger where the sorbent moves between plates or around tubing that includes a cooling media. As shown in FIG. 3, a (cold-side) cooling fluid 320 is inputted into the various cooling devices 316. The cooling fluid extracts heat from the corresponding bed of sorbent particles and forms a (hot-side) cooling fluid 324. In one configuration the thermal energy collected by the hot cooling fluid 324 is substantially removed, and the cooled cooling fluid recycled as the (cold-side) cooling fluid 320.

The distributor 312 separates each of the distinct fluidized bed stages and is designed to support the overlying fluidized bed from the bottom and also redistribute the fluidizing gas as it migrates through the fluidized bed separator 138 vessel. The distributors can be designed to substantially minimize pressure loss as the fluidizing gas passes through the distributor while maintaining substantially a distinct fluid bed level in each stage and substantially optimized to distribute the gas effectively throughout the bed of sorbent.

While any suitable method may be used to transfer sorbent particles from one bed to another, a common mechanism for moving sorbent particles from an upper bed 400 to a lower bed 400 is through down corners 350, which can be either interior or exterior to the separator 138 vessel or both. As can be seen from FIG. 3, the adjacent down corners 350 are offset from one another and not aligned to prevent short circuiting of sorbent particles.

After the sorbent exits the separator 138, it is transferred to the sorbent regenerator 136, which includes a plurality of stages 370a-z, each stage comprising, like the stages 308a-n of the separator 138, a distributor 312 but unlike the separator 138 heating device(s) 382 rather than cooling device(s) 316. The above description of these components applies equally to the sorbent regenerator 136. The heating device(s) 382 can be any suitable heating device, with an indirect heat exchanger being typical. In one configuration, the regenerator 136 is a single fluidized bed. In one configuration, the separator and regenerator vessels are stacked so that no sorbent conveying is necessary between the two vessels. In another configuration, some means of pneumatic, mechanical, or other conveying mechanism transports the sorbent particles between vessels. In either configuration, the sorbent addition and extraction locations in the separator and/or regenerator are separated using one or more baffles.

Although mechanical conveying of the sorbent can be utilized to transfer the sorbent from one reaction vessel to the next, to increase the reliability of the system it is preferable to minimize equipment with moving parts. Therefore, pneumatic conveying is generally used to move the sorbent from the separator 138 to the regenerator 136 and from the regenerator 136 to the separator 138. Referring to FIG. 3, the loaded sorbent particles from the lowermost stage 308n of the separator 138 are conveyed pneumatically to the uppermost stage 370a of the regenerator 136. A carrier gas 380, which may be a slip- or bleed stream of the treated and/or pre-treated gas streams 120 or 304 and/or target gas component-rich product gas 132. In one configuration, a slipstream of the product stream 132 is partly dried and pressurized before being used to convey the sorbent from the separator 138 to the regenerator 136 and from the regenerator 136 to the separator 138. In another configuration, flue gas, target gas component lean flue gas, steam, nitrogen, or air is to convey the sorbent from the regenerator 136 to the separator 138.

The regenerator 136 utilizes a change in temperature, pressure, or partial pressure to regenerate the sorbent and release the sorbed target gas component, thereby forming the target gas component lean sorbent. When a temperature increase is utilized to regenerate the sorbent in the regenerator 136, the temperature can be increased through direct, indirect, or a combination of direct and indirect heating. The heat input should be sufficient to address both the sensible heat required to change the temperature of the sorbent as well as overcome the enthalpy of reaction required to release the target gas component and any other sorbates, which may be endothermic. The operating temperature of the separator 138 is commonly in a range of from about 25° C. to about 500° C. and even more commonly of from about 30 to about 80° C. while the operating temperature of the regenerator 136 is commonly in a range of from about 35 to about 600 and even more commonly of from about 80 to about 150° C. The operating temperature difference between the separator 138 and the regenerator 136 is commonly in the range of from about 5 to about 300 and more commonly in the range of from about 60 to about 100° C. When a pressure change is utilized to regenerate the sorbent in the regenerator 136, the (total) operating pressure in the separator 138 is commonly in a range of from about 1 to about 150 and even more commonly of from about 1 to about 80 atm while the operating pressure of the regenerator 136 is commonly in a range of from about 0.5 to about 100 and even more commonly of from about 1 to about 20 atm. When a pressure change is utilized the operating pressure difference between the separator 138 and the regenerator 136 is commonly in the range of from about 0.5 to about 80 and more commonly in the range of from about 0.5 to about 10 atm. In one configuration, a sweep gas, either steam or a mixture of steam and target gas component, is injected into the regenerator 136. In the case of the staged fluidized bed regenerator 136, the target gas component lean sorbent is extracted from the last stage 370z (where target gas component loading is lower than the other stages).

The fluidizing gases of the separator 138 and regenerator 136 are different. In the separator 128, the fluidizing gas is the gas stream 304 from which separation of the target gas component or some other constituent is desired. In the regenerator 136, the fluidizing gas is the target gas component, steam, an inert gas, or a combination thereof.

To control levels of sorbed acid gas and/or other acid and/or salt component on the sorbent, a bleed stream down corner 390, which can be either interior or exterior to the regenerator 136 vessel or both, withdraws a portion of the sorbent 394 from the regenerator 136 for further regeneration treatment. As noted, the target gas component lean sorbent 394 is contacted sequentially with the regeneration and wash solutions to form a fully regenerated sorbent for recycle to the separator 138. The fully regenerated sorbent is combined with the lean sorbent 204 for recycle to the gas component separator 138.

Figure 4:
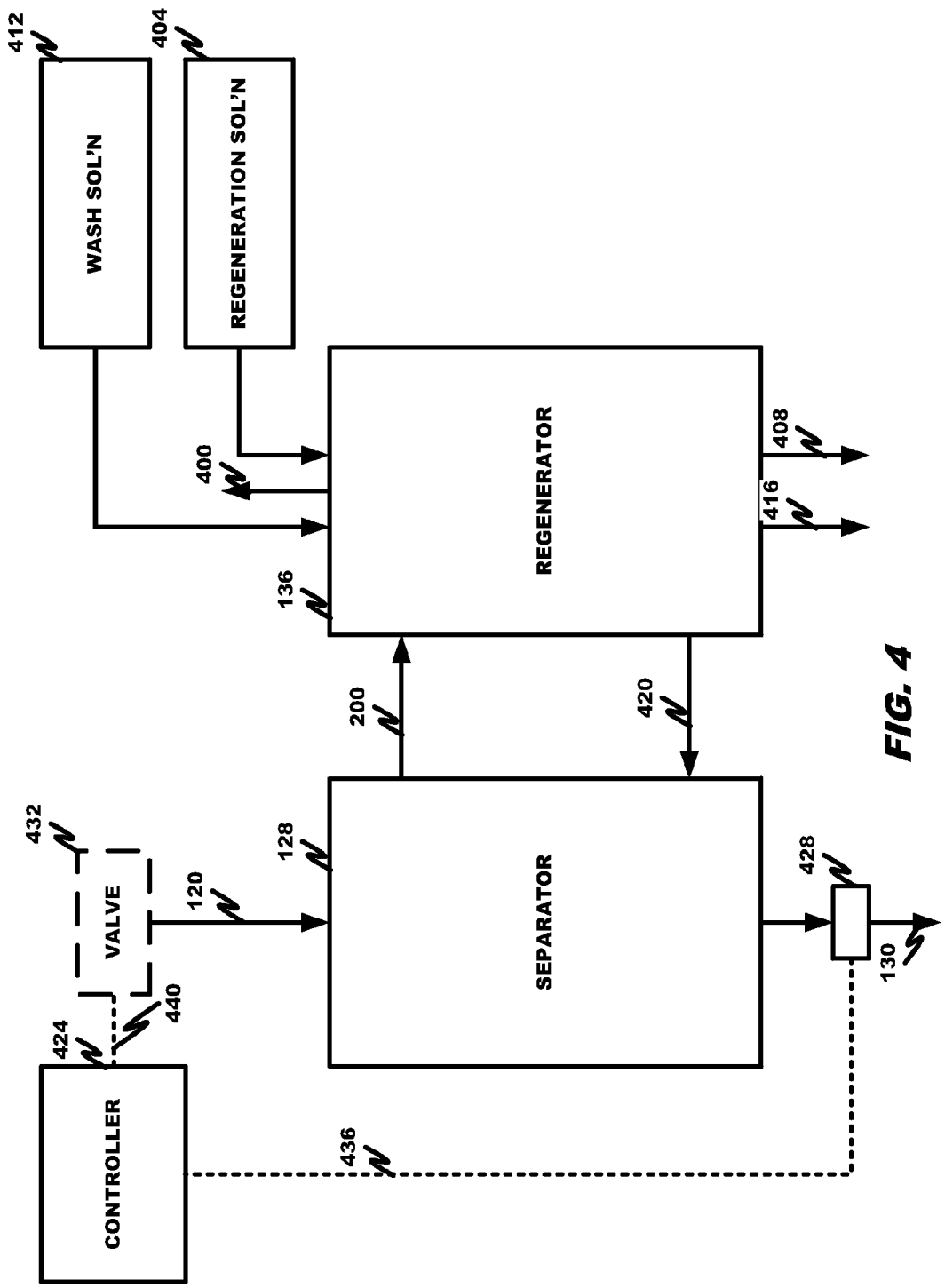
FIG. 4 is a block diagram of a regeneration system according to an embodiment of the disclosure.

A second example of this process will be discussed with reference to FIG. 4. The separator 128 and regenerator 136 may be operated continuously or discontinuously (e.g., batch operation). The treated gas stream 120 passes through the separator 128 containing the sorbent, which removes the target gas component and collects acid from the treated gas stream 120 and/or salt derived therefrom on the sorbent surface. The loaded sorbent 200 is transferred continuously or discontinuously from the separator 128 to the regenerator 136 for target gas component and acid and/or salt removal. Regeneration begins by desorbing the target gas component from the loaded sorbent 200, thereby forming a target gas component-containing fluid stream (which may be a liquid or gas stream) 400. The regeneration solution 404 is next contacted, while in the regenerator 136, with the target gas component lean sorbent to remove most of the acid and/or salt deposits from the sorbent and form a contaminated regeneration solution 408. The partially treated sorbent is next contacted, while in the regenerator 136, with the wash solution 412 to remove most of any remaining acid and/or salt deposits, base, and/or derivatives from the reaction of the acid and/or salt with the base from the partially treated sorbent surface to form a fully treated or regenerated sorbent 420 and a contaminated wash solution 416. As noted, the contaminates in the contaminated regeneration and wash solutions 408 and 416 can be removed prior to recycle to the regenerator 136 in the next regeneration cycle. The fully treated sorbent 420 is transferred continuously or discontinuously from the regenerator 136 to the separator 128 for target gas component removal from the treated gas stream 120.

A controller 424 is in electrical communication with a sensor 428 and a valve 432 via control lines 436 and 440. The controller 424 comprises regeneration instructions stored in a tangible and non-transient computer readable medium (not shown). The sensor 428 can detect a concentration or level of the target gas component in the purified gas stream 130. The sensor 428 can use any known technique for this detection, including a flame ionization detector, nondispersive infrared detector, photoionization detector, zirconium oxide sensor cell, catalytic sensor, metal oxide semiconductor sensor, thermal conductivity detector, electrochemical gas sensor, carbon dioxide sensor, carbon monoxide detector, holographic sensor, hydrogen sulfide sensor, nitrogen oxide sensor, sulfur oxide sensor, and the like. The valve 432 can enable or disable treated gas stream 120 flow to and through the separator 128. Flow can be disabled or blocked by the valve 432, for instance, when the sorbent has been moved to the regenerator 136. Some configurations remove only a portion of the loaded sorbent from the separator 128 for regeneration in the regenerator 136 and return fully treated sorbent 420 on a continuous or semi-continuous basis while the treated gas stream 120 passes through the separator 128. The regeneration instructions receive signals from the sensor 428 indicating an amount of the target gas component in the purified gas stream 130 and, based on the sensed amount, opens or closes the valve 432 to permit sorbent regeneration.

Figure 5:
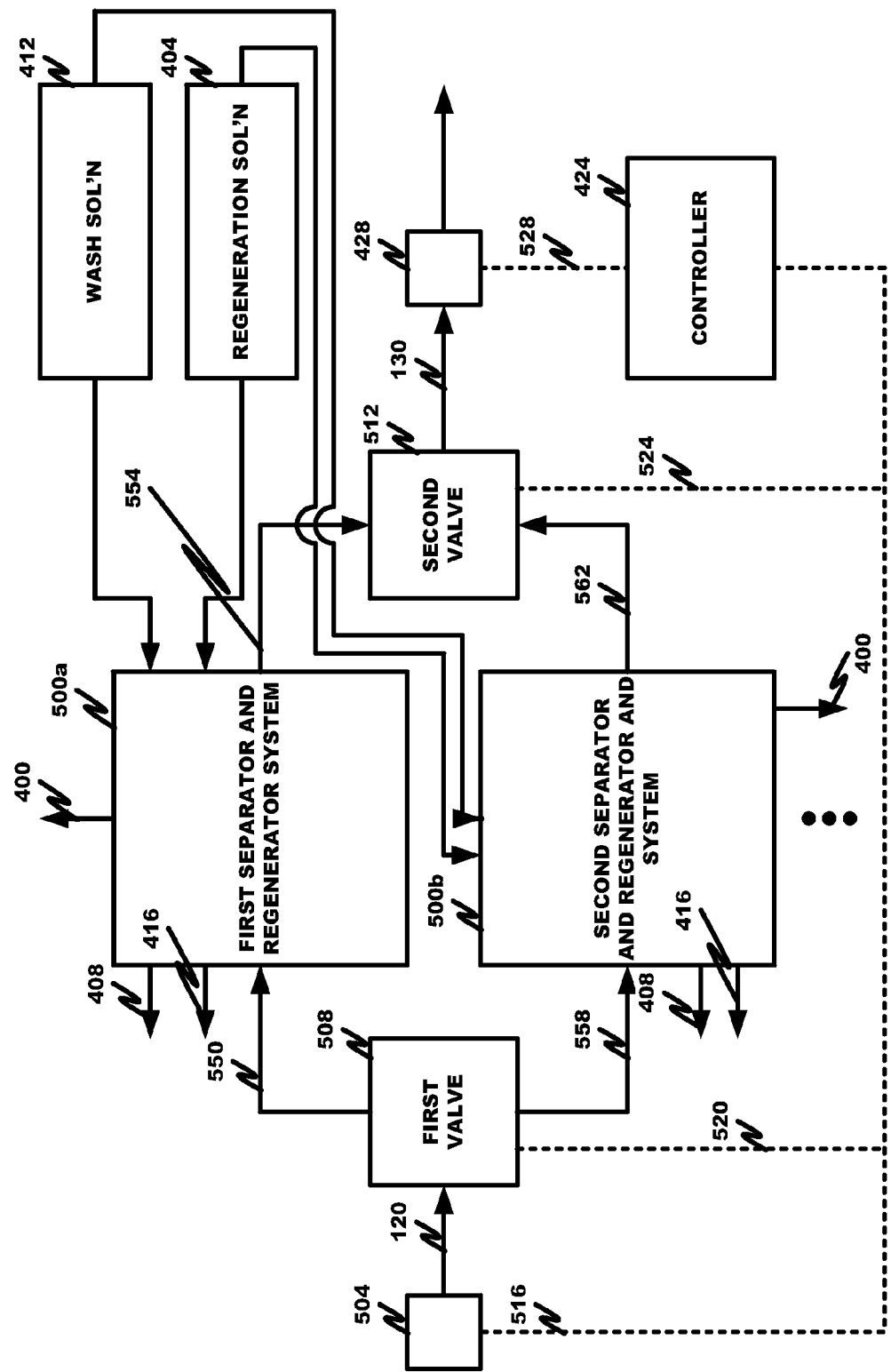
FIG. 5 is a block diagram of a regeneration system according to an embodiment of the disclosure.

A further example of this process will be discussed with reference to FIG. 5. The first and second separator and regenerator systems 500a-b may be operated continuously or discontinuously (e.g., batch operation). Although only one vessel may be used for both separation and regeneration, it is to be understood that multiple, separate vessels are typically used for separation and regeneration as described above. The treated gas stream 120 passes through a selected one of the separator and regenerator systems containing the sorbent, which removes the target gas component and collects acid from the treated gas stream 120 and/or salt derived therefrom on the sorbent surface. Although the first and second separator and regenerator systems 500a-b can operate concurrently, they typically operate over discrete time intervals.

The controller 424 is in electrical communication with an upstream and downstream sensor 504 and 428, respectively, and first and second valves 508 and 512, respectively, via control lines 516, 520, 524, and 528. The controller 424 comprises regeneration instructions stored in a tangible and non-transient computer readable medium (not shown). The upstream sensor 504, like the downstream sensor 428, detects a concentration or level of the target gas component and/or acid gas in the purified gas stream 130. The upstream sensor 504, like the downstream sensor 428, can use any known technique for this detection. The first and second valves 508 and 512 can enable or disable treated gas stream 120 flow to and through either of the separator and regenerator systems 500a,b. Stated another way, the first and second valves 508 and 512 operate together to divert treated gas stream 120 flow to a selected one of the first and second separator and regenerator systems 500a,b, thereby bypassing the other of the first and second separator and regenerator systems 500a,b. The regeneration instructions receive signals from the upstream and downstream sensors 504 and 428 indicating an amount of the target gas component and/or acid gas in the treated gas stream 120 and purified gas stream 130, respectively, and, based on the sensed amount, sets the first and second valves 508 and 512 to direct gas flow to the desired separator and regenerator system.

In a first operating mode, the treated gas stream 120 follows first flow path 550 and 554 and passes through the first separator and regenerator system 500a while bypassing the second separator and regenerator system 500b. In this first operating mode, the sorbent in the bypassed second separator and regenerator system 500b is being regenerated as discussed above to remove the sorbed target gas component and acid and/or salt deposits from the sorbent surface.

In a second operating mode, the treated gas stream 120 follows first flow path 558 and 562 and passes through the second separator and regenerator system 500b while bypassing the first separator and regenerator system 500a. In this second operating mode, the sorbent in the bypassed first separator and regenerator system 500a is being regenerated as discussed above to remove the sorbed target gas component and acid and/or salt deposits from the sorbent surface.

The selection of the first or second operating modes is made by the controller 424 based on the detected levels of the target gas component and/or acid gas in the treated gas stream 120 and purified gas stream 130, respectively. Stated another way, when the detected levels of the target gas component and/or acid gas in the treated gas stream 120 and purified gas stream 130, respectively, indicate that at least a determined amount of the target gas component and/or acid gas is passing through the sorbent bed without being collected and therefore that the sorbent is at or near its collection capacity, the controller 424 operates the first and second valves 508 and 512 to terminate the first operating mode and initiate the second operating mode, thereby allowing the loaded sorbent in the first separator and regenerator system 500a to be fully regenerated. Likewise, when the detected levels of the target gas component and/or acid gas in the treated gas stream 120 and purified gas stream 130, respectively, indicate that at least a determined amount of the target gas component and/or acid gas is passing through the sorbent bed without being collected and therefore that the sorbent is at or near its collection capacity, the controller 424 operates the first and second valves 508 and 512 to terminate the second operating mode and initiate the first operating mode, thereby allowing the loaded sorbent in the second separator and regenerator system 500a to be fully regenerated.

In this way, a hybrid approach is provided where the sorbent may be regenerated in a continuous process which may be bypassed when the sorbent is free from contamination.

Regeneration Logic

Figure 6:
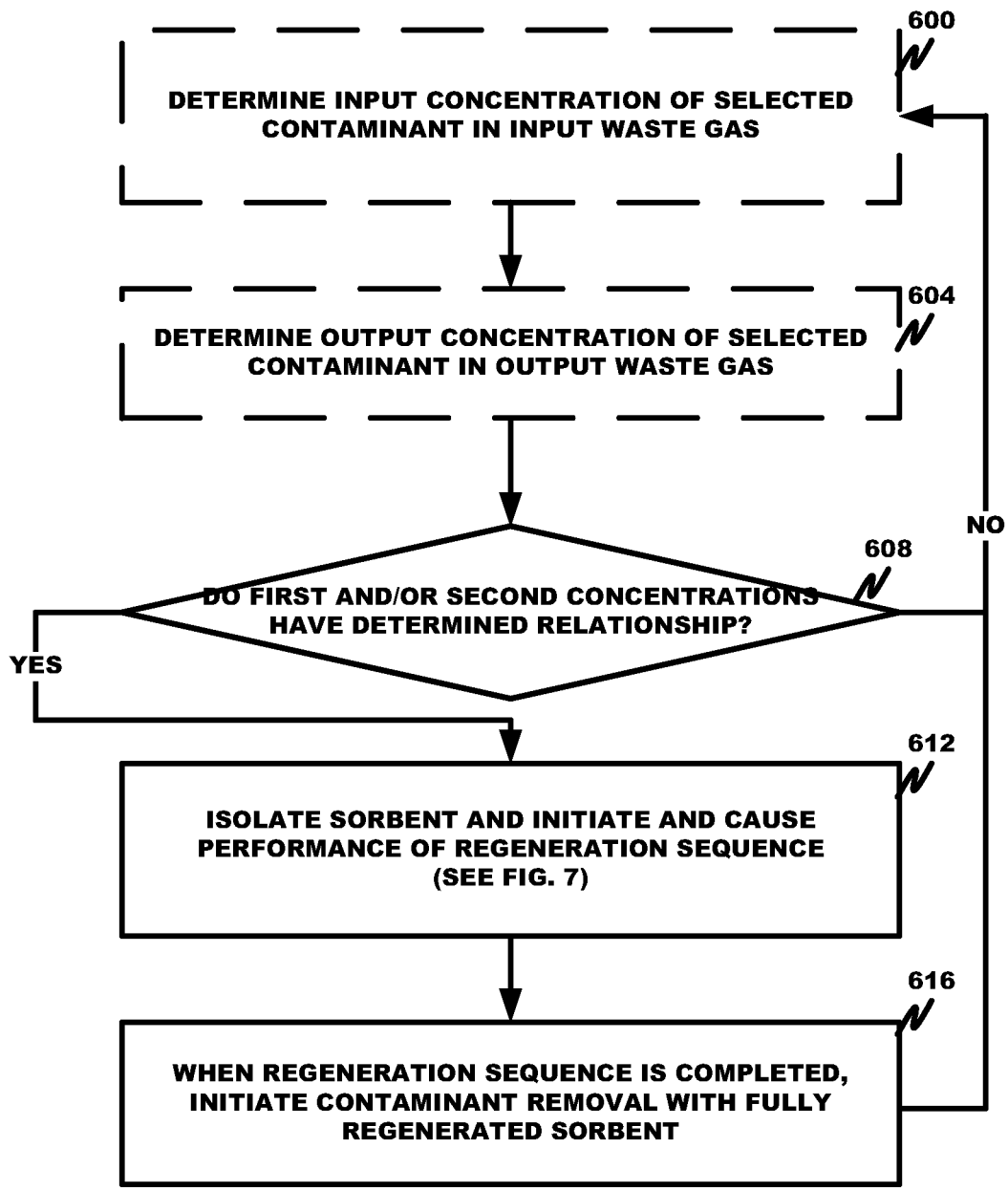
FIG. 6 is a flow chart of regeneration logic according to an embodiment of the disclosure.

The microprocessor executable (automated) regeneration logic of the controller 424 will now be discussed with reference to FIG. 6.

In optional step 600, the controller 424 determines an input concentration of a selected contaminant (e.g., either or both of the target gas component and acid gas) in the input waste gas (e.g., the treated gas stream 120).

In step 604, the controller 424 determines an input concentration of a selected contaminant (e.g., either or both of the target gas component and acid gas) in the output waste gas (e.g., the purified gas stream 130).

In decision diamond 608, the controller 424 determines whether the first and second contaminant concentrations have a determined relationship with respect to one another. The determined relationship can take many forms. In one form, the controller 424 uses the first (input) and second (output) contaminant concentrations to determine when the sorbent is at or near its collection capacity. When at or near capacity, the determined relationship is deemed to exist. In another form, the controller 424 uses the second contaminant concentration alone. When the second contaminant concentration is at or above a selected level, the determined relationship is deemed to exist. In another form, the controller 424 uses the first contaminant concentration alone to determine an amount of contaminant contacting the sorbent bed. When the amount indicates the sorbent is at or near its collection capacity, the determined relationship is deemed to exist. Other relationships may be used as will be appreciated by one of ordinary skill in the art.

When the determined relationship is deemed to exist, the controller 424 isolates the sorbent bed and initiates the regeneration sequence (e.g., as described in FIG. 7) (step 612). In the system of FIG. 5, this means, for example, entering the second operating mode from the first operating mode or vice versa.

When the regeneration sequence is completed, the controller 424 initiates contaminate removal with the regenerated sorbent (step 616). In the system of FIG. 5, this means, for example, re-entering the first operating mode from the second operating mode or vice versa. In other applications, the first operating mode is re-entered after the sorbent is fully regenerated and when the determined relationship is deemed to exist.

When the determined relationship is not deemed to exist or after step 616, the controller returns to step 600.

EXPERIMENTAL

The following examples are provided to illustrate certain aspects, embodiments, and configurations of the disclosure and are not to be construed as limitations on the disclosure, as set forth in the appended claims. All parts and percentages are by weight unless otherwise specified.

The regeneration system of this disclosure was tested at the laboratory-scale. The first step was to expose $CO_2$ sorbents to $SO_2$. Approximately 2.0 g of sorbent was placed into a quartz fixed bed reactor and the reactor was placed into the fume hood. Then, 1% $SO_2$ in nitrogen was run through the tube for 980 minutes at a 100 mL/min flow rate, allowing 98 L of total gas exposure. Once the gas was shut off, nitrogen was run through the set-up as to flush out $SO_2$ in the tubes and minimize risk of exposure.

To make the solution to remove the heat stable salt ("HSS") 4.24 g (see calculation 1) of $Na_2CO_3$ was placed in 75 mL of de-ionized (DI) water and placed on a stir plate for 5 minutes until all solid had dissolved. The pH was measured to be 12 (i.e. highly basic). Next, the sorbent were added to the mixture and left to mix on the stir plate for 1 hour. After this time had elapsed, the sorbent was filtered out of the solution and rinsed with DI water. It was assumed that one rinse would not be sufficient to fully remove all remnants of the $Na_2CO_3$ solution so the sorbent was placed into a beaker with a stir bar and water and left to stir for intervals of 15 minutes, after which it was filtered and then stirred with fresh DI water for another 15 minutes. This rinsing process was completed three 3 times after which the solution reached a pH of close to 7 (i.e. neutral).

Test results therefore establish the disclosed system can return the $CO_2$ sorbent to neutral pH levels. This can achieve the goal of extending sorbent life, thereby reducing operational costs.

A number of variations and modifications of the disclosure can be used. It would be possible to provide for some features of the disclosure without providing others.

For example in one alternative embodiment, automated control logic simply performs regeneration at determined times, regardless of a remaining capacity of the sorbent to remove the target gas component.

In another alternative embodiment, less automated control logic is employed as one or more of the steps is performed manually.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    receiving a gas stream, the gas stream comprising a target gas component and at least one acid gas, the at least one acid gas being different from the target gas component;
    contacting the gas stream with a sorbent to remove at least a portion of the target gas component to form a purified gas stream and a loaded sorbent comprising the removed target gas component, the sorbent also removing and the loaded sorbent also comprising a portion of the at least one acid gas;
    removing at least most of the removed target gas component from the loaded sorbent to form a lean sorbent comprising at least most of the removed portion of the at least one acid gas and/or a salt thereof; and
    contacting the lean sorbent with a regeneration solution to remove at least most of the removed portion of the at least one acid gas and/or a salt thereof and form for recycle to the gas stream contacting step the sorbent,
    wherein the target gas component is a carbon oxide, wherein the at least one acid gas is one or more of a sulfur oxide, a nitrogen oxide and hydrogen sulfide, wherein the sorbent is an amine-base sorbent, and wherein the regeneration solution has a pH of at least pH 10.

2. The method of claim 1, wherein the acid gas comprises $SO_2$, wherein the target gas component is $CO_2$, wherein the regeneration solution comprises a base, wherein at least most of the $CO_2$ in the received gas stream is removed by the sorbent, wherein $CO_2$ is removed from the loaded sorbent by one or more of a pressure swing, temperature swing, and combination thereof, and wherein the sorbent is in the form of a solid.

3. A method comprising:
    receiving a gas stream, the gas stream comprising a target gas component and at least one acid gas, the at least one acid gas being different from the target gas component;
    contacting the gas stream with a sorbent to remove at least a portion of the target gas component to form a purified gas stream and a loaded sorbent comprising the removed target gas component, the sorbent also removing and the loaded sorbet also comprising a portion of the at least one acid gas;
    removing at least most of the removed target gas component from the loaded sorbent to form a lean sorbent comprising at least most of the removed portion of the at least one acid gas and/or a salt thereof; and
    contacting the lean sorbent with a regeneration solution to remove at least most of the removed portion of the at least one acid gas and/or a salt thereof and form for recycle to the gas stream contacting step the sorbent,
    wherein bonds between adjacent sorbent components and between the sorbent components and an adjacent sorbent substrate are stronger than bonds between the sorbent component and the target gas component and between the sorbent component and the at least one acid gas and/or salt thereof.

4. The method of claim 3, wherein the regeneration solution does not significantly impact the strengths of the bonds between the between adjacent sorbent components and between the sorbent components and an adjacent sorbent substrate.

5. The method of claim 4, wherein the regeneration solution comprises a base that is at least one of an alkali or alkaline earth metal carbonate, at least one of an alkali or alkaline earth metal hydroxide, an alkoxide, a metal oxide, ammonia, a metal amine, a carboxylate, a phosphine, an ether, a ketone, an alkene, and $CH_3^-$.

6. A method, comprising:
    receiving a gas stream, the gas stream comprising a target gas component and at least one acid gas, the at least one acid gas being different from the target gas component;
    contacting the gas stream with a sorbent to remove at least a portion of the target gas component to form a purified gas stream and a loaded sorbent comprising the removed target gas component, the sorbent also removing and the loaded sorbent also comprising a portion of the at least one acid gas;

removing at least most of the removed target gas component from the loaded sorbent to form a lean sorbent comprising at least most of the removed portion of the at least one acid gas and/or a salt thereof;

contacting the lean sorbent with a regeneration solution to remove at least most of the removed portion of the at least one acid gas and/or a salt thereof and form for recycle to the gas stream contacting step the sorbent; and after contact of the lean sorbent with the regeneration solution, contacting the sorbent with a wash solution to remove any deposit on the sorbent after contact with the regeneration solution.

7. A system, comprising:

a gas component separator configured to (a) receive a gas stream, the gas stream comprising a target gas component and at least one acid gas, the at least one acid gas being different from the target gas component, and (b) contact the gas stream with a sorbent to remove at least a portion of the target gas component and a portion of the at least one acid gas to form a purified gas stream and a loaded sorbent comprising the removed target gas and the removed acid gas;

a sorbent regenerator configured to remove at least most of the removed target gas component from the loaded sorbent to form a lean sorbent comprising at least most of the removed acid gas and/or a salt thereof; and a regeneration vessel configured to contact the lean sorbent with a regeneration solution to remove at least most of the removed acid gas and/or a salt thereof and form for recycle to the gas component separator the sorbent, wherein the target gas component is a carbon oxide, wherein the at least one acid gas is one or more of a sulfur oxide, a nitrogen oxide and hydrogen sulfide, wherein the sorbent is an a mine-base sorbent, and wherein the regeneration solution has a pH of at least about pH 10.

8. The system of claim 7, wherein the acid gas comprises $SO_2$, wherein the target gas component is $CO_2$, wherein the regeneration solution comprises a base, wherein at least most of the $CO_2$ in the received gas stream is removed by the sorbent, wherein in the sorbent regenerator $CO_2$ is removed from the loaded sorbent by one or more of a pressure swing, temperature swing, and combination thereof, and wherein the sorbent is in the form of a solid.

9. The system of claim 8, wherein bonds between the between adjacent sorbent components and between the sorbent and an adjacent sorbent substrate are stronger than bonds between the sorbent and the target gas and between the sorbent and the at least one acid gas and/or salt thereof and wherein the regeneration solution does not significantly impact the strengths of the bonds between the between adjacent sorbent components and between the sorbent and the adjacent sorbent substrate.

10. The system of claim 9, wherein the regeneration vessel is further configured, after contact of the lean sorbent with the regeneration solution, to contact the sorbent with a wash solution to remove any deposit on the sorbent after contact with the regeneration solution.

11. A system, comprising:

a gas component separator configured to (a) receive a gas stream, the gas stream comprising a target gas component and at least one acid gas, the at least one acid gas being different from the target gas component, and (b) contact the gas stream with a sorbent to remove at least a portion of the target gas component and a portion of the at least one acid gas to form a purified gas stream and a loaded sorbent comprising the removed target gas and the removed acid gas;

a sorbent regenerator configured to remove at least most of the removed target gas component from the loaded sorbent to form a lean sorbent comprising at least most of the removed one acid gas and/or a salt thereof;

a regeneration vessel configured to contact the lean sorbent with a regeneration solution to remove at least most of the removed acid gas and/or a salt thereof and form, for recycle to the gas component separator, the sorbent; and a controller comprising microprocessor readable and executable instructions stored on a non-transient and tangible computer readable medium that, when executed, determine a concentration of the target gas component and/or at least one acid gas in the received gas stream and/or purified gas stream and, when a determined relationship involving the determined concentration of the target gas component and/or at least one acid gas in the received gas stream and/or purified gas stream is deemed to exist, initiate regeneration of the loaded sorbent.

12. In a system to remove a target gas component from a gas stream, the gas stream comprising the target gas component and at least one acid gas and the at least one acid gas being different from the target gas component, by contacting the gas stream with a sorbent to remove at least a portion of the target gas component to form a purified gas stream and a target gas component loaded sorbent, the sorbent also removing a portion of the at least one acid gas, a tangible and non-transient computer readable medium comprising microprocessor readable and executable instructions that, when executed, perform operations comprising:

determine a concentration of a target gas component and/or at least one acid gas in at least one of the gas stream and the purified gas stream and, when a determined relationship involving the determined concentration of the target gas component and/or at least one acid gas in the at least one of the gas stream and the purified gas stream is deemed to exist, cause the following sub-operations to be performed;

removing at least most of the removed at least a portion of the target gas component from the loaded sorbent to form a lean sorbent, the lean sorbent comprising at least most of the removed portion of the at least one acid gas and/or a salt thereof; and contacting the lean sorbent with a regeneration solution to remove at least most of the removed portion of the at least one acid gas and/or a salt thereof and form a fully treated sorbent for recycle.

13. The computer readable medium of claim 12, wherein the instructions, when executed, select between first and second operating modes of the system based on whether the determined relationship is deemed to exist, wherein in the first operating mode, the gas stream passes through a first gas component separator but not a second gas component separator, a first sorbent used by the first gas component separator is not regenerated, and a second sorbent used by the second gas component separator is undergoing regeneration and wherein in the second operating mode, the gas stream passes through the second gas component separator but not the first gas component separator, the second sorbent used by the second gas component separator is not regenerated, and the first sorbent used by the first gas component separator is undergoing regeneration.

14. The computer readable medium of claim 12, wherein the determined relationship estimates at least one of an in-use and unused sorption capacity of the sorbent.

15. The computer readable medium of claim 12, wherein the target gas component is a carbon oxide, wherein the at least one acid gas is one or more of a sulfur oxide, a nitrogen oxide and hydrogen sulfide, wherein the sorbent is an amine-base sorbent, and wherein the regeneration solution has a pH of at least about pH 10.

16. The computer readable medium of claim 15, wherein the acid gas comprises $SO_2$, wherein the target gas component is $CO_2$, wherein the regeneration solution comprises a base, wherein at least most of the $CO_2$ in the received gas stream is removed by the sorbent, wherein in a sorbent regenerator $CO_2$ is removed from the loaded sorbent by one or more of a pressure swing, temperature swing, and combination thereof, and wherein the sorbent is in the form of a solid.

17. The computer readable medium of claim 16, wherein bonds between the between adjacent sorbent components and between the sorbent component and an adjacent sorbent substrate are stronger than bonds between the sorbent component and the target gas component and between the sorbent component and the at least one acid gas and/or salt thereof and wherein the regeneration solution do not significantly impact the strengths of the bonds between the between adjacent sorbent components and between the sorbent component and an adjacent sorbent substrate.

18. The computer readable medium of claim 17, wherein the regeneration solution is contacted with the lean sorbent in a regeneration vessel, wherein the regeneration vessel is further configured, after contact of the lean sorbent with the regeneration solution, to contact the sorbent with a wash solution to remove any deposit on the sorbent after contact with the regeneration solution.

* * * * *